United States Patent [19]
Matsui et al.

[11] Patent Number: 6,052,239
[45] Date of Patent: Apr. 18, 2000

[54] PORTABLE DISPLAY DEVICE

[75] Inventors: Takeshi Matsui, Tokyo; Akira Kawamura, Kanagawa; Shunichi Hashimoto, Kanagawa; Yoshinori Tanaka, Kanagawa, all of Japan

[73] Assignee: Sony Corporation, Japan

[21] Appl. No.: 08/984,097

[22] Filed: Dec. 3, 1997

[30] Foreign Application Priority Data

Dec. 6, 1996 [JP] Japan .................................. 8-326527

[51] Int. Cl.[7] .............................. G02B 27/02; G02B 3/60; G02B 7/62
[52] U.S. Cl. ......................... 359/802; 359/809; 359/817
[58] Field of Search ................................ 359/802, 809, 359/817

[56] References Cited

U.S. PATENT DOCUMENTS 5,663,762  9/1997  Richard .................................. 359/817

Primary Examiner—Georgia Epps
Assistant Examiner—Michael A Lucas
Attorney, Agent, or Firm—Rader, Fishman & Grauer; Ronald P. Kananen

[57] ABSTRACT

In a non-use state in which a cover (2) is closed (FIG. 6A), a lens (11R) is accommodated in a housing (1) such that the lens is in a so-called laid state. In a use state in which the cover (2) is open (FIG. 6B), the lens (11R) is exposed from the housing (1) and is set in a so-called rise state. In this state, when a user looks through the lens (11R), the user can see an virtual image formed by magnifying an image displayed on a display panel (12R) with the lens (11R).

14 Claims, 26 Drawing Sheets

IN CASE OF SHORT DISTANCE
(NARROW ANGLE OF VIEW,
ASPECT RATIO = 4 : 3 )

IN CASE OF LONG DISTANCE
(WIDE ANGLE OF VIEW,
ASPECT RATIO = 16 : 9 )

FIG. 10
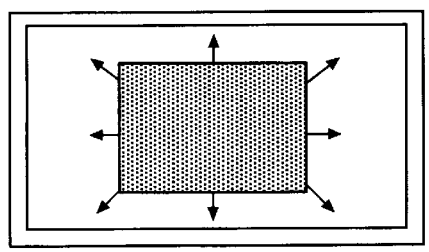
CENTER
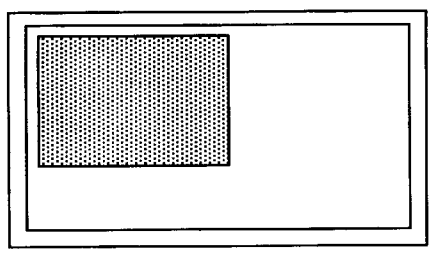 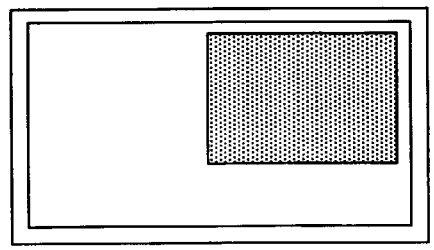
UPPER LEFT   UPPER RIGHT
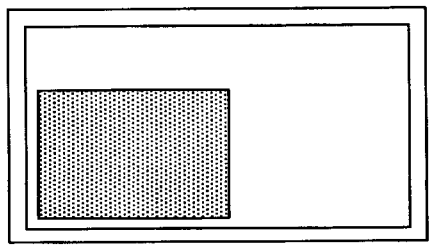 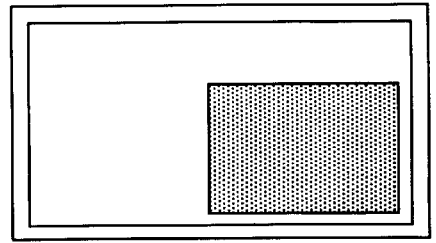
LOWER LEFT   LOWER RIGHT

PORTABLE DISPLAY DEVICE

BACKGROUND OF THE INVENTION

1. Field of the Invention

The present invention relates to a portable display device and, more particularly, to a portable display device which is suitably used in an apparatus such as a portable television receiver, a pager, a portable telephone set, or an electronic organizer which is portably used and can display information.

2. Description of the Related Art

As a device (to be referred to as a portable display device hereinafter) which is portably used and can display information, for example, a portable telephone set or a portable television receiver is known.

For example, in a portable telephone set, as shown in FIG. 27, an operation unit arranged in the main body (the main body of a portable image information display device) is operated to display the telephone number of a desired destination or other information on an information display unit.

Since the portable display device including the portable telephone set described above is formed in a small size to easily carry (bear) the portable display device, a display screen for displaying information (video image) such as a character is so small that a lot of information cannot be easily displayed at once.

In the conventional portable display device, as shown in FIG. 27, since the information display unit for displaying information is exposed, the information displayed on the display unit may be seen by the other.

In addition, when the information display unit receives strong external light out of doors, the contrast of the display screen may be degraded by reflection of the external light, and a user may be hard to see the display unit.

A user having poor sight cannot easily see information (video image) displayed on the small display screen.

Furthermore, in a portable television receiver cannot easily provide to a user a video image having power and the feeling of being at a live performance.

When the portable display device is operated, the device must be held with one hand, and an operation must be performed with the other hand. This is inconvenient when the user makes notes.

There is a method of increasing a display screen to make a video image legible. However, in this case, the device increases in size and weight, and the portability of the device is degraded. In addition, a power consumption required to display a video image increases, and the device cannot easily use for a long time.

As a device which is conveniently portable and legibly provides a lot of information, for example, a device which displays information with an virtual image is disclosed in Japanese Unexamined Patent Publication No. 2-86338.

However, development of a device which is further compact and is conveniently portable is desired.

SUMMARY OF THE INVENTION

The present invention has been made in consideration of the above circumstances, and has as its object to provide a device which is conveniently portable, can legibly provide a lot of information, and is smaller than a conventional one.

According to the present invention, a portable display device is characterized in that a magnification optical system which magnifies information displayed on display means to form an virtual image has arrangement states which are different in a non-use state from in a use state.

In the portable display device with the above arrangement, the magnification optical system which magnifies information displayed on the display means to form an virtual image has arrangement states which are different in a non-use state from in a use state.

BRIEF DESCRIPTION OF THE DRAWINGS

FIG. 10 is a view for explaining a method of changing a direction in which an imaginary image is formed.

DESCRIPTION OF THE PREFERRED EMBODIMENTS

Embodiments of the present invention will be described. However, before the description, in order to make the relationship between the respective means of the invention according to claims and the following embodiments clear, the characteristics of the present invention will be described below such that a corresponding embodiment (however, an example) is described in brackets following each means.

Figure 2:
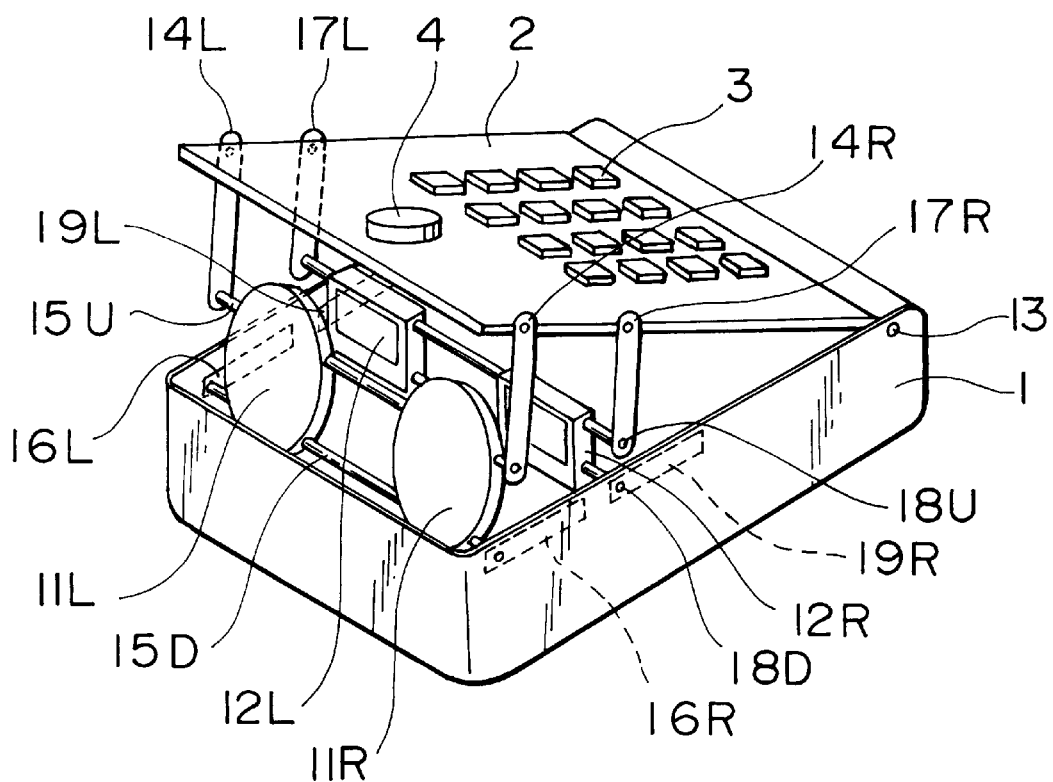
FIG. 2 is a perspective view showing the arrangement of the first embodiment of the portable display device according to the present invention.

More specifically, a portable display device according to claim 1 is a portable display device comprising display means (for example, display panels 12L and 12R or the like shown in FIG. 2) for displaying information and a magnification optical system (for example, lenses 11L and 11R or the like shown in FIG. 2) for magnifying the information displayed on the display means to form an virtual image, and is characterized in that the magnification optical system has arrangement states which are different in a non-use state from in a use state.

A portable display device according to claim 4 further comprises a housing (for example, a housing 1 or the like shown in FIG. 2) with a lid (for example, a cover 2 or the like shown in FIG. 2), and is characterized in that the magnification optical system has arrangement states which are different in a closed state of the lid from in an open state of the lid, and the magnification optical system is arranged such that a display screen of the display means is magnified to form an virtual image when the lid is open.

A portable display device according to claim 7 is characterized in that a left-eye optical system (for example, the lens 11L or the like shown in FIG. 2) and a right-eye optical system (for example, the lens 11R or the like shown in FIG. 2) are arranged as the magnification optical system.

A portable display device according to claim 8 is characterized in that left-eye display means (for example, the display panel 12L or the like shown in FIG. 12) and right-eye display means (for example, the display panel 12R or the like shown in FIG. 2) are arranged as the display means, and a left-eye optical system or a right-eye optical system forms an virtual image which is obtained by magnifying information displayed on the left-eye display means or the right-eye display means, respectively.

Figure 9:
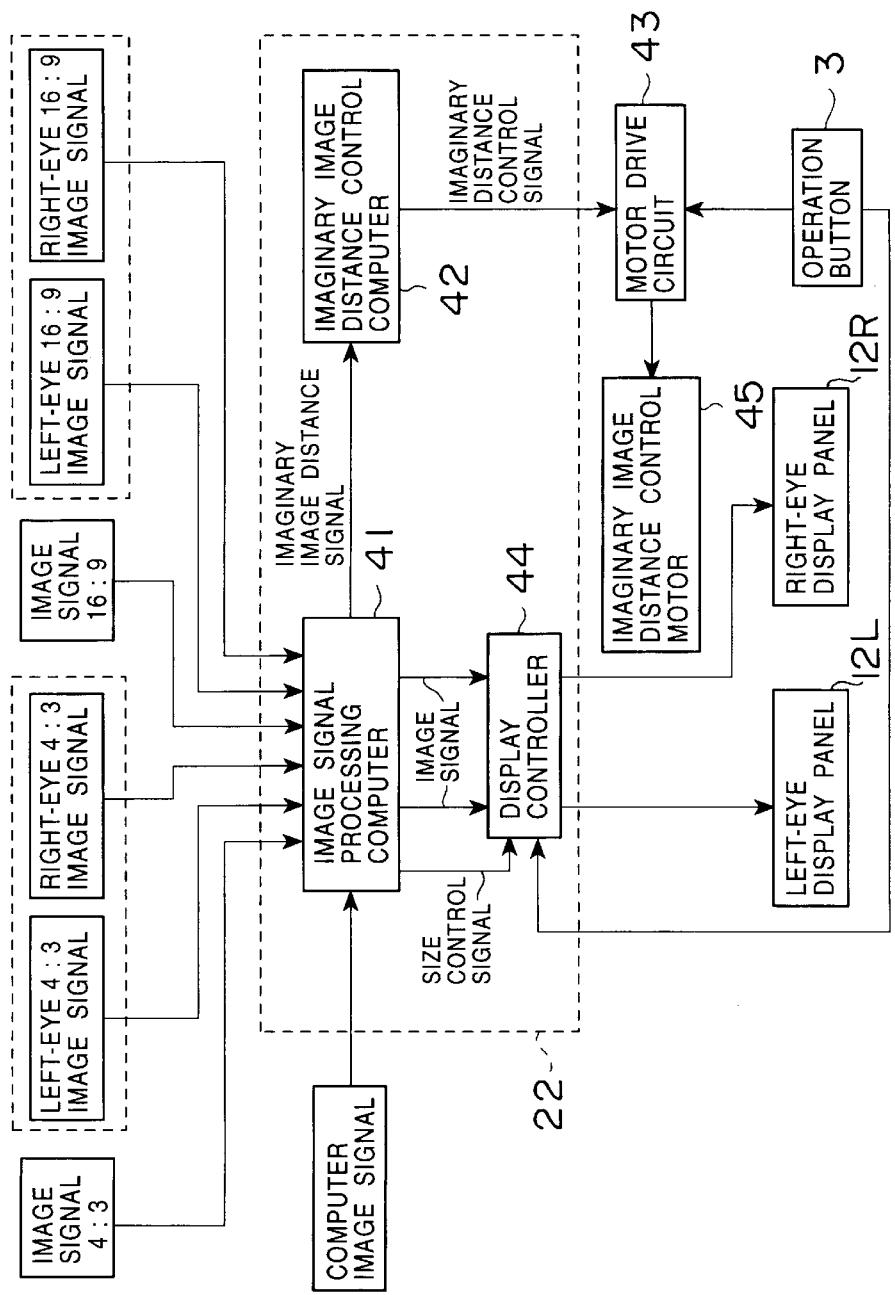
FIG. 9 is a block diagram showing the electric arrangement of the second embodiment.

A portable display device according to claim 10 is characterized by further comprising change means (for example, a display controller 44, an virtual image distance control motor 45, or the like shown in FIG. 9) for changing a distance between the virtual image formed by the magnification optical system and a user, the size of the virtual image, or the direction of the virtual image.

A portable display device according to claim 11 is characterized by further comprising control means (for example, a video signal processing computer 41 or the like shown in FIG. 9) for controlling the change means in accordance with the information.

A portable display device according to claim 12 is characterized by further comprising operation means (for example, an operation button 3 or the like shown in FIG. 9) operated when the change means is controlled.

A portable display device according to claim 13 is characterized by further comprising communication means (for example, a communication function unit 21 or the like shown in FIG. 3) for receiving external information or transmitting information to an external device.

In this description, the respective means are not limited to the above-mentioned means.

Figure 1:
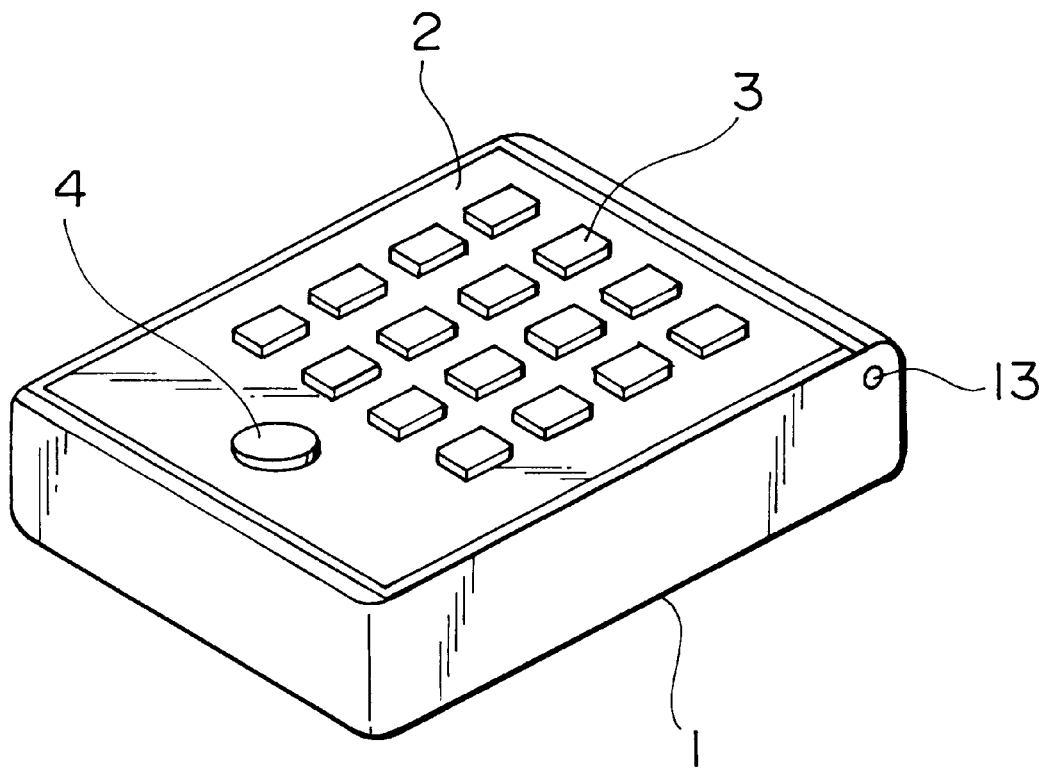
FIG. 1 is a perspective view showing the arrangement of the first embodiment of a portable display device according to the present invention.

FIGS. 1 to 3 show the arrangement of the first embodiment of a portable display device according to the present invention. FIGS. 1 and 2 are perspective views of the portable display device, and FIG. 3 is a sectional view of the right side surface of the portable display device shown in FIGS. 1 and 2.

In this portable display device, a cover 2 is in a closed state as shown in FIG. 1 when the portable display device is not used (non-use state), thereby improving convenience for portability. When the portable display device is used (use state), the cover 2 is opened as shown in FIG. 2, thereby setting lenses 11L and 11R in an exposure state. When the lenses 11L and 11R are set in the exposure state, an image (video image) serving as information displayed on a compact display panel 12L or 12R which is constituted by, e.g., a liquid-crystal light bulb or the like, is magnified by the lens 11L or 11r, respectively, thereby forming an virtual image. This virtual image is provided to a user.

More specifically, in a non-use state, as shown in FIG. 1, the cover 2 is set in a closed state, and the lenses 11L and 11R (also, the display panels 12L and 12R) are set in an accommodation state such that the lenses 11L and 11R are accommodated in the housing 1.

On the cover 2, an operation button 3 for outputting commands for various processes to the portable display device and inputting required information and an assembly knob 4 for opening the cover 2 are arranged. The cover 2 is supported on the housing 1 by a cover pin 13 such that the cover 2 is pivoted (opened/closed) about the cover pin 13 as a center.

The cover 2 is biased by, e.g., an elastic member (not shown) such as a spring. When the assembly knob 4 is operated, the biasing force opens the cover 2 as shown in FIG. 2. When the cover 2 is in a closed state, the cover 2 is locked by a predetermined lock mechanism (not shown).

As shown in FIGS. 2 and 3, one end of the lens link 14L or 14R is pivotally attached to the left or right side surface of the side, opposing the side on which the cover pin 13 is attached, of the cover 2, respectively. A lens pin 15U is attached to the other ends of the lens links 14L and 14R. The lens pin 15U passes through the upper portions of the lenses 11L and 11R.

A lens pin 15D passes through the lower portions of the lenses 11L and 11R, and the left or right end of the lens pin 15D passes through a lens groove 16L or 16R (like a slotted hole) which is narrow and long, extends from the front surface to the rear surface, and is formed on the front inside of the left or right side surface of the housing 1, respectively. The lens pin 15D is designed such that the lens pin 15D can be slid from the front to the rear along the lens grooves 16L and 16R.

One end of a panel link 17L or 17R is pivotally attached to the inner side (rear surface side) of a position, where the lens links 14L and 14R are attached, on the left or right side surface of the cover 2, respectively. A panel pin 18U is attached to the other ends of the panel links 17L and 17R. The panel pin 18U passes through the upper portions of the display panels 12L and 12R.

A panel pin 18D passes through the lower portions of the display panels 12L and 12R. The left end or right end of the panel pin 18D passes through a panel groove 19L or 19R which is narrow and long, extends from the front surface to the rear surface, and is formed on the inside of the left or right side surface of the housing 1 and on the inner side of the lens grooves 16L and 16R. The panel pin 18D is designed such that the panel pin 18D can be slid from the front to the rear along panel grooves 18L and 18R.

On the lower portion of the housing 1, the communication function unit 21 for performing communication control for receiving external information and transmitting the information to an external device and an image signal processor 22 for performing various image processes and other signal processes are arranged (FIG. 3).

Holes each having a diameter slightly larger than that of the lens pin 15U or 15D are formed in the lenses 11L and 11R. The lens pin 15U or 15D passes through the holes, respectively. Therefore, if the upper or lower portions of the lenses 11L and 11R are not fixed, the lens pin 15U or 15D can be freely rotated about the lens pin 15U or 15D serving as a rotation center, respectively.

Like the lenses 11L and 11R, the display panels 12L and 12R can be freely rotated about the panel pin 18U or 18D serving as a rotation center, respectively.

Figure 3A:
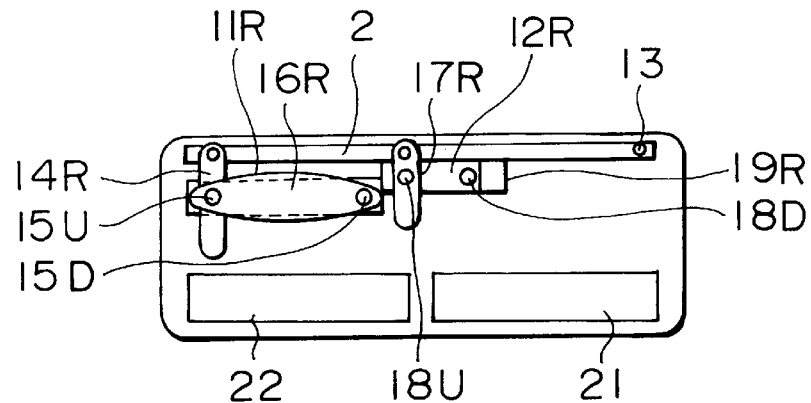
FIG. 3, consisting of FIGS. 3A to 3C, is a sectional view showing the arrangement of the first embodiment of the portable display device according to the present invention.

In the portable display device with the above arrangement, when the cover 2 is closed, as shown in FIG. 3A, the lens pin 15D is located at the ends in the rear-surface direction along the lens grooves 16R and 16L. At this time, the lens pin 15U is arranged at the position having a height equal to the height of the lens grooves 16L and 16R. In this manner, the lenses 11L and 11R are arranged such that the optical axes of the lenses 11L and 11R are perpendicular to the cover 2 (the principal planes are parallel to the cover 2).

In addition, in this case, the panel pin 18D is also located at the ends in the rear-surface direction along the panel grooves 19R and 19L. At this time, the panel pin 18U is also arranged at the position having a height equal to the height of the panel grooves 19L and 19R. In this manner, the display panels 12L and 12R are arranged such that the display screens of the display panels 12L and 12R are parallel to the cover 2.

When the cover 2 is closed as described above, the lenses 11L and 11R and the display panels 12L and 12R are arranged in a so-called lie-down state (laid state), and are accommodated in the housing 1.

Figure 3B:
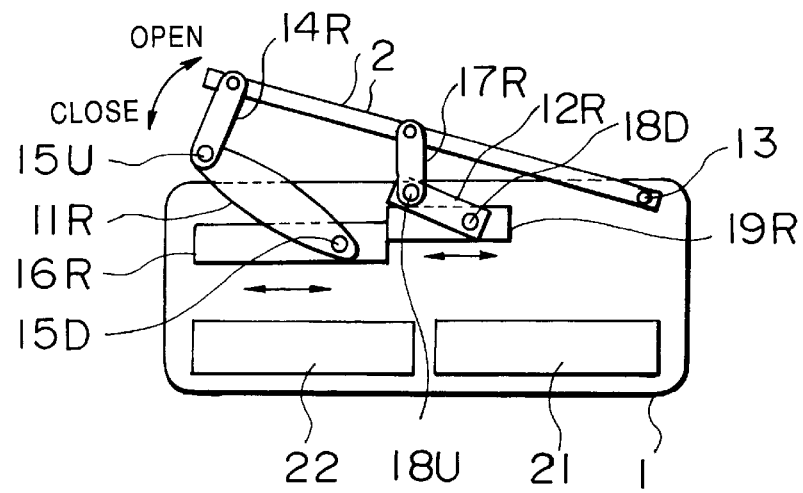

When the assembly knob 4 is operated, the cover 2 is opened with the biasing force of the elastic member. When the cover 2 is opened as shown in FIG. 3B, the lens links 14L and 14R are lifted up, and the lenses 11L and 11R are also lifted up. When the lenses 11L and 11R are lifted up, the lens pin 15D moves in the front-surface direction along the lens grooves 16R and 16L.

When the cover 2 is opened, the panel links 17L and 17R are also lifted up, and the display panels 12L and 12R are also lifted up. When the display panels 12L and 12R are lifted up, the panel pin 18D moves in the front-surface direction along the panel grooves 19R and 19L.

Thereafter, when the cover 2 is more opened, the lenses 11L and 11R and the upper portions of the display panels 12L and 12R are more lifted up, the lens pin 15D and the panel pin 18D more move in the front-surface direction. When the lens pin 15D reaches the ends of the lens grooves 16L and 16R in the front-surface direction, and the panel pin 18D reaches the ends of the panel grooves 19R and 19L in the front-surface direction, the cover 2 is locked.

Figure 3C:
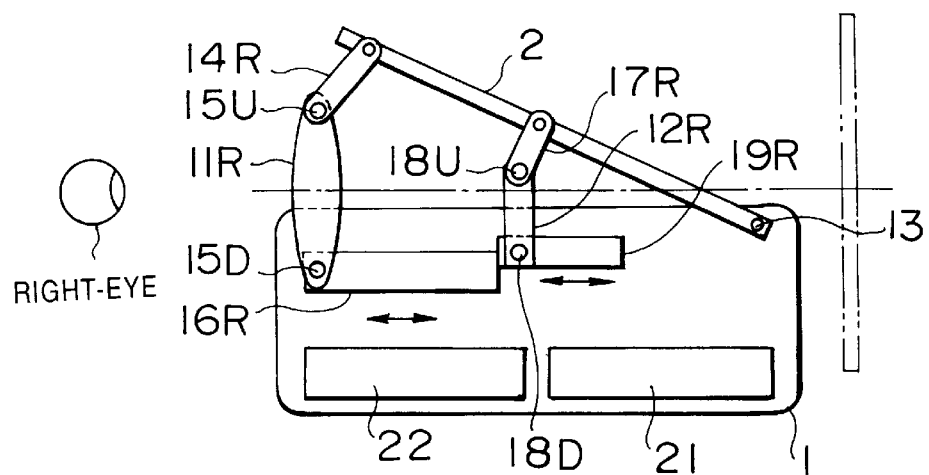

At this time, as shown in FIG. 2 or 3C, the lenses 11L and 11R and the display panels 12L and 12R are arranged in a so-called stand-up state (rise state) such that the lenses 11L and 11R and the display panels 12L and 12R are rotated at 90° from the state shown in FIG. 3A.

In this state, when an image (video image) serving as information is displayed on the display panel 12L or 12R, the image is magnified by the lens 11L or 11R, respectively, thereby forming an virtual image. Therefore, when a user looks through the lens 11L or 11R with his/her left or right eye, the user can observe the virtual image.

Here, when the distance between an object and the lens is shorter than the focal distance of the lens, an virtual image is formed on the object side. The detailed principle that the virtual image is formed is described in "Rense No Kagaku Nyumon" by Toshiki Ogura, Asashi Sonorama Sha, "Kougaku" by Kazumi Murata, Science Sha, or the like.

The virtual image is obtained by magnifying images displayed on the display panels 12L and 12R. For this reason, even a user who has poor sight can easily see the virtual image. Even if small images are displayed on the display panels 12L and 12R, these images are magnified by the lenses 11L and 11R. For this reason, an image having power and the feeling of being at a live performance can be provided. In addition, even if a lot of information having a small size is displayed on the display panels 12L and 12R, an virtual image obtained by magnifying the information is formed. For this reason, a lot of information can be provided to a user at once. Since the user can observe an virtual image by looking through the lenses 11L and 11R, the information can be prevented from being seen by other persons. In addition, external light does not make it difficult to see the virtual image.

As described above, the lenses 11L and 11R have arrangement states which are different in a non-use state from in a use state. More specifically, the cover 2 is closed to set the lenses 11L and 11R in a laid state in the non-use state, and the cover 2 is closed to set the lenses 11L and 11R in a rise state in the use state. For this reason, the device can be constituted to have a size smaller than that of a conventional one.

More specifically, the diameter of a lens is generally larger than the thickness of the lens. When the device is used, light serving as an image displayed on the display panel 12L or 12R must be incident on the lens 11L or 11R. For this purpose, in the embodiment shown in FIGS. 1 to 3, the lenses 11L and 11R must be arranged in the rise state. However, when the lenses 11L and 11R are accommodated in the housing 1 while the lenses 11L and 11R are arranged in the rise state, the housing 1 must have a height (depth) which is equal to or larger than the diameter of the lenses 11L and 11R. In addition, as shown in FIG. 3, the housing 1 must be increased in size to arrange the communication function unit 21 and the image signal processor 22 in the housing 1.

On the other hand, in this embodiment, the lenses 11L and 11R are arranged in the laid state and accommodated in the housing 1. For this reason, the housing 1 may have at least a height which is equal to the thickness of the lenses 11L and 11R. Therefore, the device can be constituted to have a smaller size, and the portability of the device can be improved. When the size of the housing 1 is equal to that of a conventional one, the housing 1 has a spare space formed therein. For this reason, a block such as an electric circuit for performing another process can be arranged in the housing 1.

In this embodiment, since not only the lenses 11L and 11R but also the display panels 12L and 12R are arranged in the laid state to be accommodated in the housing 1, the device can be further reduced in size.

From the state shown in FIG. 2 or 3C, when the lenses 11L and 11R and the display panels 12L and 12R are accommodated in the housing 1 as shown in FIG. 1 or 3A, the cover 2 may be pressed downward by force which is stronger than the biasing force of the elastic member biasing the cover 2. In this case, in contrast to the case described in FIG. 3B, the lens pin 15D and the panel pin 18D move in the rear-surface direction. In this manner, the lenses 11L and 11R and the display panels 12L and 12R gradually fall. When the cover 2 is pressed to a predetermined position, the cover 2 is locked. In this manner, as shown in FIG. 1 or 3A, the cover 2 is kept closed.

Although not shown in FIGS. 1 to 3, the device can have a mechanism for making it possible to mount the device on the head of a user. In this case, the user mounts the device on his/her head, and the user can observe an virtual image. For this reason, the user need not hold the device, and can easily make notes.

The communication function unit 21 can be designed to control telephone communication through, e.g., a public network. In this case, the portable display device functions as a portable telephone set. In this case, for example, an address and a telephone number are stored in a memory (not shown), the pieces of information are converted into images by the image signal processor 22, and the images can be displayed on the display panels 12L and 12R. The communication function unit 21 can also be designed to receive information transmitted through the public network, and the image signal processor 22 can be designed to convert the information into images and display the images on the display panels 12L and 12R. The communication function unit 21 can also be designed to transmit the images displayed on the display panels 12L and 12R. In addition, the image signal processor 22 can also be designed in the following manner. That is, a disk reproduction device for reproducing a disk-like medium such as a DVD (Digital Versatile Disk) is incorporated in the image signal processor 22, and images reproduced from such a disk are displayed on the display panels 12L and 12R.

Figure 4:
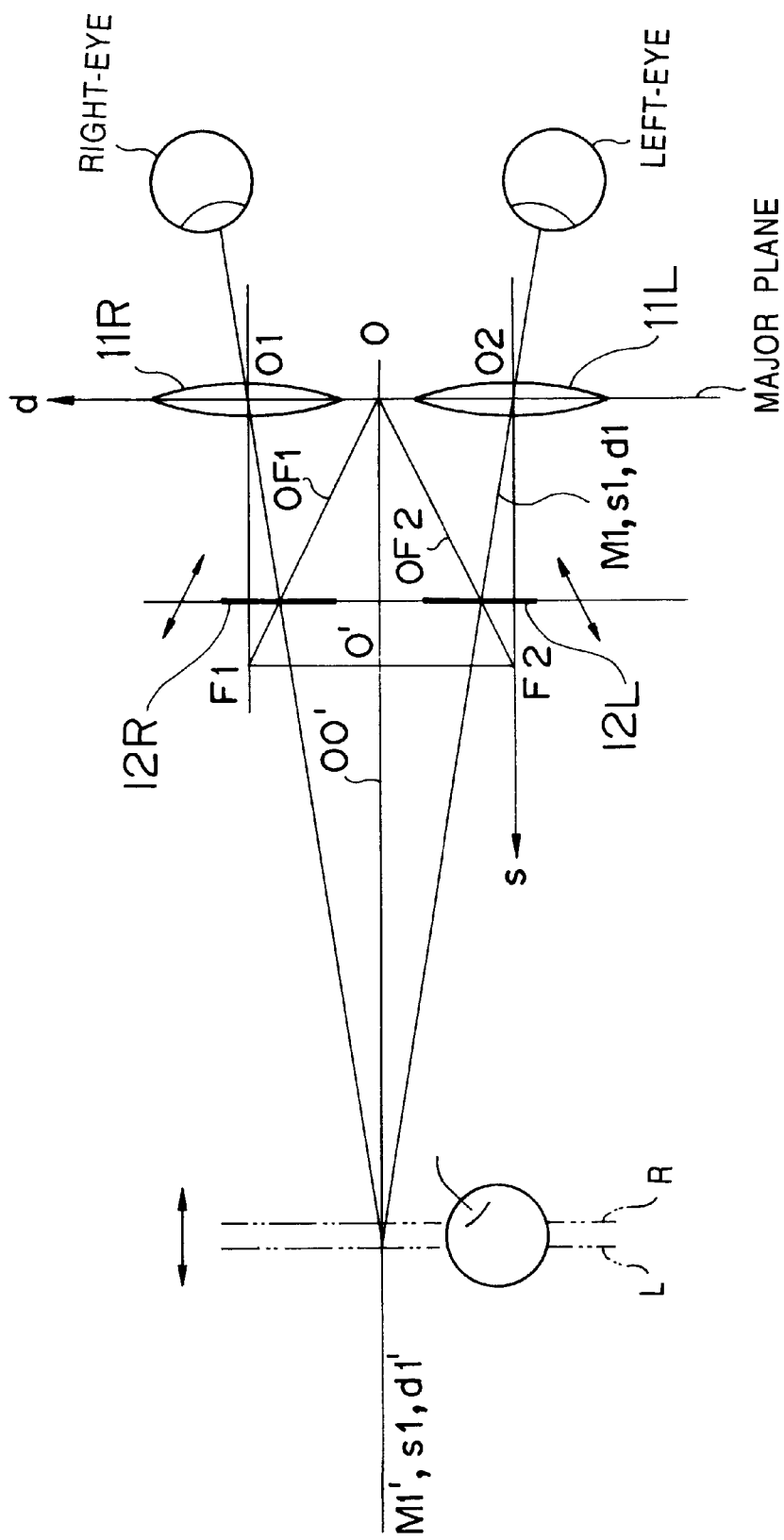
FIG. 4 is a view for explaining the arrangement of an optical system of the first embodiment.

FIG. 4 shows an arrangement of an optical system of the first embodiment. FIG. 4 shows the section of the upper surface of the optical system when the lenses 11L and 11R and the display panels 12L and 12R are set in an exposure state as shown in FIG. 2 or 3C.

As shown in FIG. 4, the portable display device has, as a magnifying optical system for magnifying an image to form an virtual image, the lens 11L serving as (constituting) a left-eye optical system and the lens 11R serving as a right-eye optical system, which lenses have different optical axes.

More specifically, the lens 11R or 11L is a convex lens, having the same characteristics, for providing an virtual image R or L obtained by magnifying an image displayed on the display panel 12R or 12L to a right or left eye, respectively. These lenses are arranged on the same plane. Therefore, the lenses 11R and 11L are arranged to have the same principal plane.

Here, in FIG. 4, reference symbol O1 or O2 represents the principal point of the lens 11R or 11L, respectively. Reference symbol F1 or F2 represents the focal point of the lens 11R or 11L, respectively. Reference symbol O represents the middle point between the principal points O1 and O2.

The central point (for example, when the display panel 12R or 12L is rectangular, an intersection of diagonal lines of the rectangle) of the display panel 12R or 12L is located on a straight line OF1 or OF2 obtained by connecting the middle point O and the focal point F1 or F2, respectively, and the display panels 12R and 12L are arranged to be located on the same plane.

According to the portable display device with the above arrangement, an image displayed on the display panel 12R or 12L is magnified by the lens 11R or 11L, and light corresponding to the magnified image is incident on a right or left eye. In this manner, an virtual image corresponding to this image is observed by the right or left eye. More specifically, the virtual image R or L formed by the lens 11R or 11L is observed by the right or left eye, respectively.

According to the arrangement in FIG. 4, the virtual image observed by the right or left eye is formed by the lens 11R or 11L serving as different optical systems, respectively. However, these virtual images are arranged on the same position in the stereoscopic space. More specifically, the virtual images observed by the left and right eyes of a user are arranged at the same position in the space.

This is caused by the following reason. More specifically, for example, the direction from the principal point O2 to the principal point O1 is set as d axis, and the optical-axis direction (direction from the principal point O2 to the focal point F2) of the lens 11L is set as s axis. The central point of the display panel 12L is represented by M1, and the coordinates of the central point M1 on an sd plane are represented by (s1,d1). The central point of the virtual image L formed by the lens 11L is represented by M1', and the coordinates of the central point M1' on the sd plane are represented by (s1',d1'). Furthermore, the middle point between the focal points F1 and F2 is represented by O'.

In this case, as described above, the display panel 12R or 12L is on the same plane, and the central point of the display panel 12R is 12L is on the straight line OF1 or OF2, respectively. For this reason, the distance between the display panel 12R and the principal plane of the lens 11R is equal to the distance between the display panel 12L and the principal plane of the lens 11L (the lenses 11R and 11L are on the same plane as described above). Therefore, since the virtual images R and L are on the same plane, if the central points of the virtual images R and L are on the straight line OO' obtained by connecting the middle points O and O' to each other, the virtual images R and L must be located at the same position.

The central point M1 (s1,d1) of the display panel 12L is on the straight line OF2, the following equation is established:

$$d1 = L/2 - L \times s1/(2 \times f) \quad (1)$$

where L represents the distance between the principal points O1 and O2, and f represents the focal distance of the lens 11L.

On the other hand, the following equation is established according to the image-forming formula:

$$1/f = 1/s1 - 1/s1' \quad (2)$$

In addition, since the principal point O2 and the central points M1 and M1' are on the same straight line, the following equation is established:

$$s1/s1' = d1/d1' \quad (3)$$

On the basis of equations (1) to (3), the following equation can be obtained:

$$d1' = L/2 \quad (4)$$

On the basis of equation (4), the central point M1' of the virtual image L is on the straight line OO'.

The optical system constituted by the lens 11L and the optical system constituted by the lens 11R are symmetrical with respect to the straight line OO'. Therefore, the central point of the virtual image R is also on the straight line OO'.

As described above, the virtual images R and L are on the same plane, and the central points of the virtual images R and L are on the straight line OO'. For this reason, the virtual images R and L must be located at the same position.

Therefore, a user can observe the virtual image in such a state that the convergences and adjustments of both the eyes are equal to each other, i.e., in a relax state (without stress).

In addition, in FIG. 4, the virtual image observed by the left eye is independently formed by the lens 11L and the display panel 12L, and the virtual image observed by the right eye is independently formed by the lens 11R and the display panel 12R. Therefore, according to this portable display device, not only a two-dimensional (planar) virtual image but also a stereoscopic virtual image can be provided. More specifically, for example, when the left-eye image and the right-eye image of a stereoscopic image using the disparity of both the eyes are displayed on the display panel 12L or 12R, a stereoscopic virtual image can be provided to the user.

When the display panel 12R or 12L is synchronously moved on the straight line OF1 or OF2 such that the central point of the display panel 12R or 12L is included in the same plane, respectively, the positions where the virtual images R and L are formed can be moved from a position near the user to the infinite-point (the distance from the user to the virtual images R and L can be changed).

More specifically, when the display panels 12L and 12R are moved along the straight lines OF1 or OF2 to positions near the lenses 11L and 11R or positions far away from the lenses 11L and 11R, respectively, the virtual images L and R move to the position near the user or the position far away from the user.

Here, the movement of the display panels 12R and 12L can be manually performed, or can also be performed by using a stepping motor or the like. However, the display panel 12R or 12L must be moved in the range on the lens 11R side or the lens 11L side with respect to the focal point F1 or F2. This is because, as described above, in order to observe an virtual image of an object, the distance between the object and a lens must be shorter than the focal distance of the lens.

Figure 5:
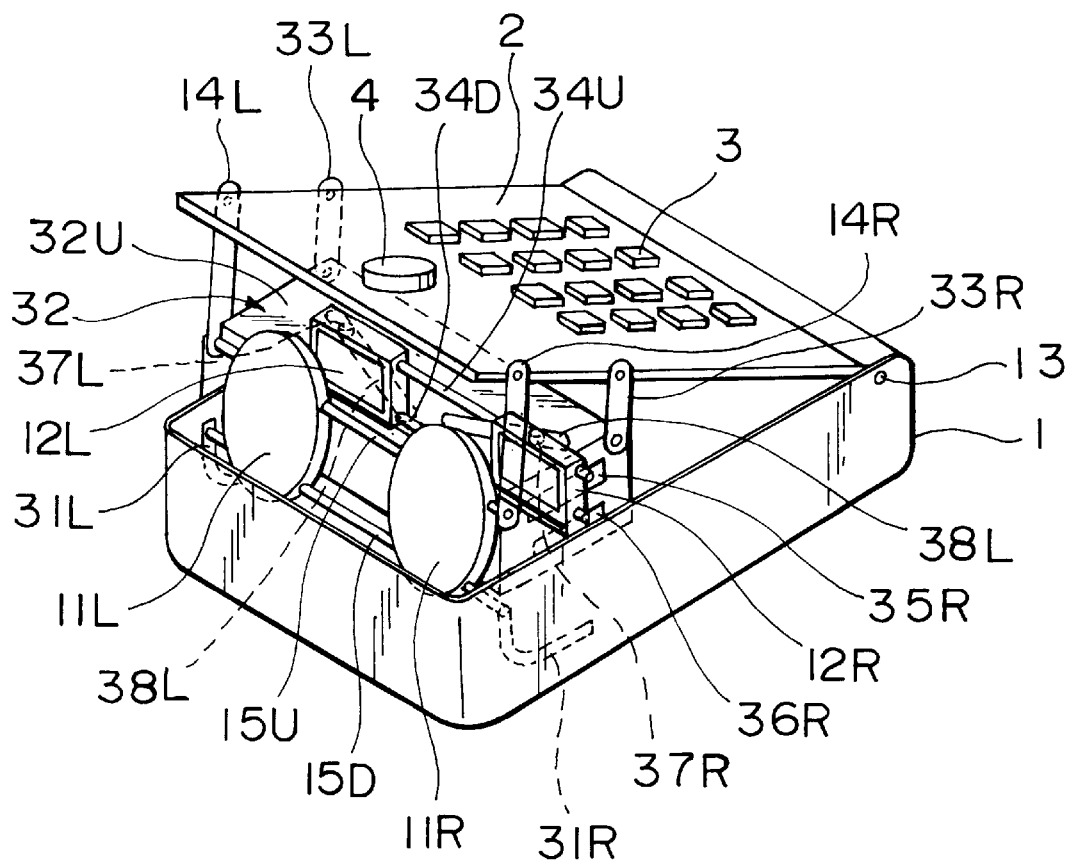
FIG. 5 is a perspective view showing the arrangement of the second embodiment of a portable display device according to the present invention.

FIGS. 5 and 6 shows an arrangement of a portable display device in which a position where an virtual image is formed can be moved as described above (the arrangement of the second embodiment of a portable display device according to the present invention). FIG. 5 is a perspective view showing the portable display device, and FIG. 6 is a sectional view showing the right side surface of the portable display device. The same reference numerals as in FIGS. 1 to 3 denote the same parts in FIGS. 5 and 6.

In the second embodiment, lens curve groove 31L or 31R which is smoothly curved is arranged in place of the straight lens groove 16L or 16R, respectively. One end or the other end of a lens pin 15D passes through the lens curve groove 31L or 31R, respectively.

An attaching portion for a display panel 12L or 12R is constituted such that the display panel 12L or 12R can move on a straight line OF2 or OF1, respectively, as shown in FIG. 4.

Figure 6A:
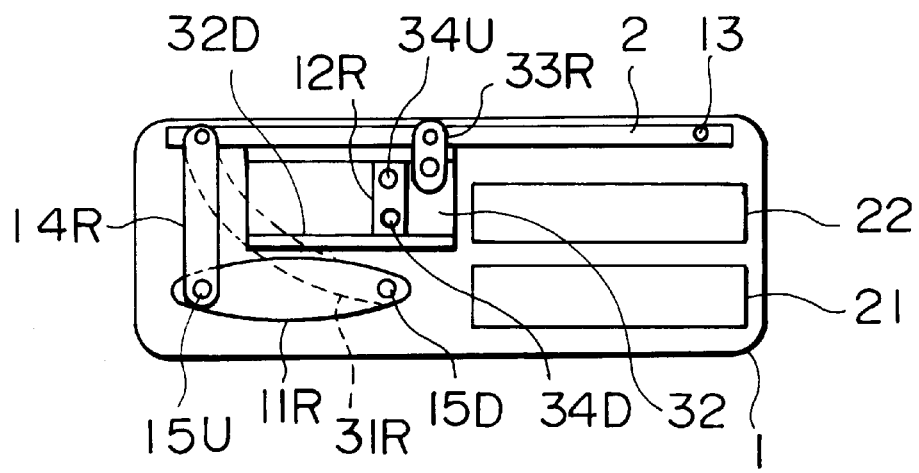
FIG. 6, consisting of FIGS. 6A and 6B, is a sectional view showing the arrangement of the second embodiment of the portable display device according to the present invention.
Figure 6B:
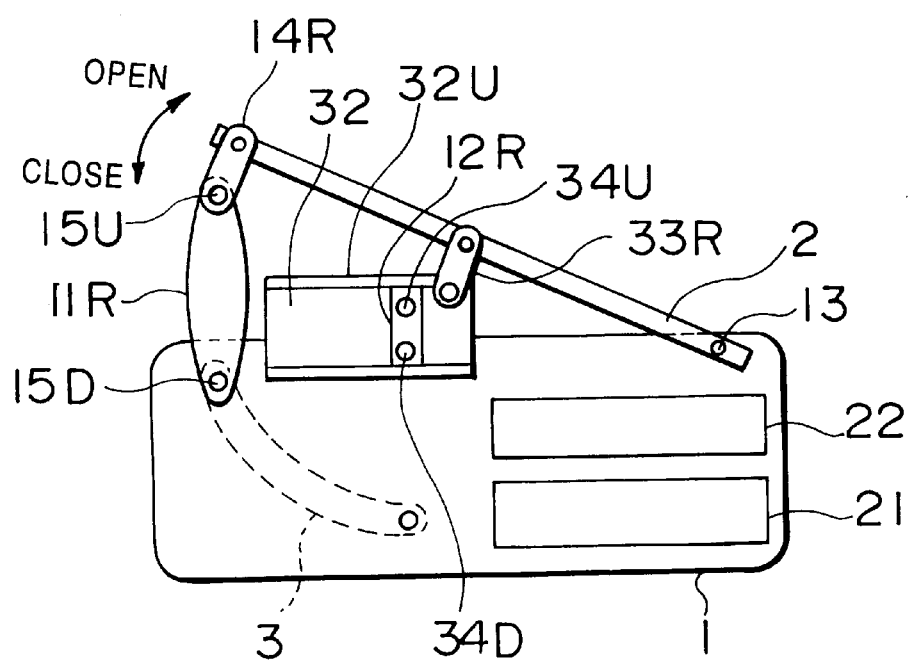

More specifically, one end of a box link 33L or 33R, like the panel link 17L or 17R, is pivotally attached on the left or right side surfaces of a cover 2 on the rear side with respect to positions where lens links 14L and 14R are attached, respectively. A panel box 32 is attached to the other ends of the box links 33L and 33R. The panel box 32 is designed to be rotated about the connection portions of the box links 33L and 33R. As shown in FIG. 6A or 6B, the panel box 32 is supported by a member (not shown) such that the display panel faces the front even if the cover 2 is closed or open.

The panel box 32 is a rectangular-parallelepiped box which is open the front or a rectangular-parallelepiped box consisting of a transparent material. Thin and long shaft grooves 35R and 36R extending from the front surface to the rear surface are formed on the upper and lower portions of the right side surface of the panel box 32. Although not shown in FIGS. 5 and 6, like the shaft groove 35R or 36R, a shaft groove 35L or 36L is formed on the left side surface of the panel box 32.

One end or the other end of a guide shaft 34U passes through the shaft groove 35R or 35L, respectively. In this manner, the guide shaft 34U can move from the front surface to the rear surface along the shaft grooves 35R and 35L. One end or the other end of a guide shaft 34D passes through the shaft groove 36R or 36L. In this manner, the guide shaft 34D can also move from the front surface to the rear surface along the shaft grooves 36R and 36L.

Either one of the display panels 12L and 12R has the upper or lower portion which passes through the guide shaft 34D or 34U, respectively. In this manner, the display panels 12L and 12R can be laterally moved along the guide shafts 34D and 34U.

Furthermore, a V-shaped groove 38R or 38L corresponding to the straight line OF1 or OF2 described in FIG. 4 is formed in an upper panel plate 32U serving as the upper surface of the panel box 32. A pin 37R or 37L arranged on the upper portion of the display panel 12R or 12L passes through the V-shaped groove 38R or 38L, respectively.

Although not shown in FIGS. 5 and 6, two grooves corresponding to the V-shaped grooves 38R and 38L are also formed in the bottom surface of the panel box 32. A pin which is arranged on the lower portion of the display panel 12R or 12L and is similar to the pin 37R or 37L passes through each of these grooves, respectively.

Therefore, the display panel 12L or 12R can move along the V-shaped groove 38L or 38R in the panel box 32, i.e., along the straight line OF2 or OF1, respectively, such that the display panel 12L or 12R is included in the same plane.

In this embodiment, an image signal processor 22 is arranged above a communication function unit 21.

In the portable display device with the above arrangement, when the cover 2 is closed, as shown in FIG. 6A, the lens pin 15D is along the lens curve grooves 31R and 31L in the rear surface direction, and is located at the ends in the bottom surface direction. In addition, at this time, the lens pin 15U is arranged at a position having a height equal to the height of the lens pin 15D. In this manner, the lenses 11L and 11R, as in the first embodiment, are arranged such that the optical axes of the lenses 11L and 11R are perpendicular to the cover 2. In this case, the lens curve grooves 31R and 31L are not straightly formed from the front surface to the rear surface unlike the first embodiment, and the lens curve grooves 31R and 31L are formed to be curved in the bottom surface direction. For this reason, in the housing 1, the lenses 11L and 11R are accommodated in a portion under a bottom surface panel plate 32D constituting the bottom surface of the panel box 32.

On the other hand, the panel box 32 is supported by the box links 33L and 33R such that the display panels 12L and 12R face the front. The panel box 32 is accommodated in the housing 1.

Here, in the second embodiment, when the cover 2 is closed, the lenses 11L and 11R are arranged in a laid state and accommodated in a portion under the panel box 32 in the housing 1. For this reason, the large space formed in the first embodiment is not formed under the lenses 11L and 11R. Therefore, the image signal processor 22 which is arranged under the lenses 11L and 11R in the first embodiment is arranged above the communication function unit 21 in the second embodiment.

An assembly knob 4 is operated to cause the elastic force of an elastic member to open the cover 2, as shown in FIGS. 5 and 6B, the lens links 14L and 14R are lifted up by opening the cover 2, and the lenses 11L and 11R are also lifted up. When the lenses 11L and 11R are lifted up, the lens pin 15D moves in the front-surface direction along the lens curve grooves 31R and 31L. Therefore, when the lens pin 15D reaches the ends of the lens curve grooves 31L and 31R in the front-surface direction, the cover 2 is locked.

At this time, the lenses 11L and 11R are fixed in a rise state in which the lenses 11L and 11R are rotated at 90° from the state shown in FIG. 6A.

When the cover 2 is opened, the box links 33L and 33R are also lifted up, and the panel box 32 is also lifted up. When the cover 2 is locked, the panel box 32 is fixed by the box links 33L and 33R in a state in which the display panels 12L and 12R have the positional relationship described in FIG. 4 with respect to the lenses 11L and 11R.

In this state, when an image (video image) is displayed on the display panel 12L or 12R, each of these images is magnified by the lens 11L or 11R, thereby forming an virtual images. Therefore, a user looks through the lens 11L or 11R with his/her left or right eye, the user can observe the virtual image.

As described above, the display panel 12L or 12R can move along the V-shaped groove 38L or 38R, i.e., the straight line OF2 or OF1, in the panel box 32 such that the display panels 12L and 12R are included in the same plane. Therefore, the display panel 12L or 12R is moved with a stepping motor or manually moved along the V-shaped groove 38L or 38R, thereby forming an virtual image at a desired position.

From the state shown in FIG. 5 or 6B, when the lenses 11L and 11R and the display panels 12L and 12R (panel box 32) are accommodated in the housing 1 as shown in FIG. 6A, the cover 2 may be pressed downward with force stronger than the biasing force of the elastic member biasing the cover 2. In this case, the lens pin 15D moves in the rear-surface direction in contrast to the case described above, so that the lenses 11L and 11R gradually fall. In addition, the panel box 32 moves downward. When the cover 2 is pressed to a predetermined position, the cover 2 is locked. In this manner, as shown in FIG. 6A, the cover 2 is kept closed.

Although an virtual image can be changed in size by changing the distance from a user as described above, the virtual image can also be changed in size by, e.g., the following method.

More specifically, FIG. 7 shows a principle that an virtual image is made changeable.

Figure 7A:
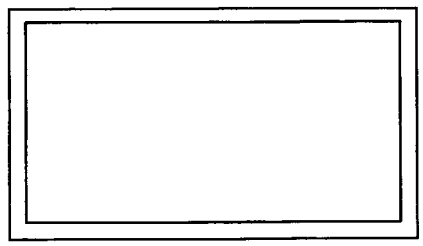
FIG. 7, consisting of FIGS. 7A to 7C, is a view for explaining the principle for making the size of an virtual image changeable.
Figure 7B:
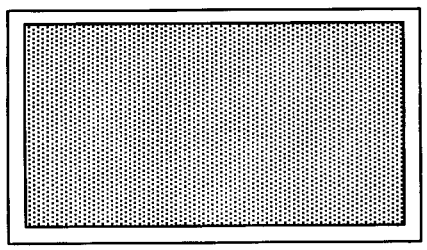
Figure 7C:
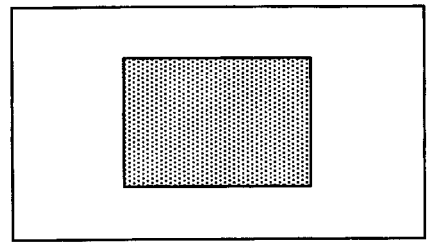

As shown in FIG. 7A, a display panel 12 (12L and 12R) has a sufficiently large display area, and the size of an image displayed on the display panel 12 is increased or decreased as indicated by shadow areas in FIGS. 7B and 7C, so that the size of an virtual image can be changed.

As described above, when the position of the display panel 12 is moved, and the size of an image displayed on the display panel 12 is changed, an image which is located at a position a proper distance away from a user and has a proper size (angle of view) can be provided to a user.

Figure 8:
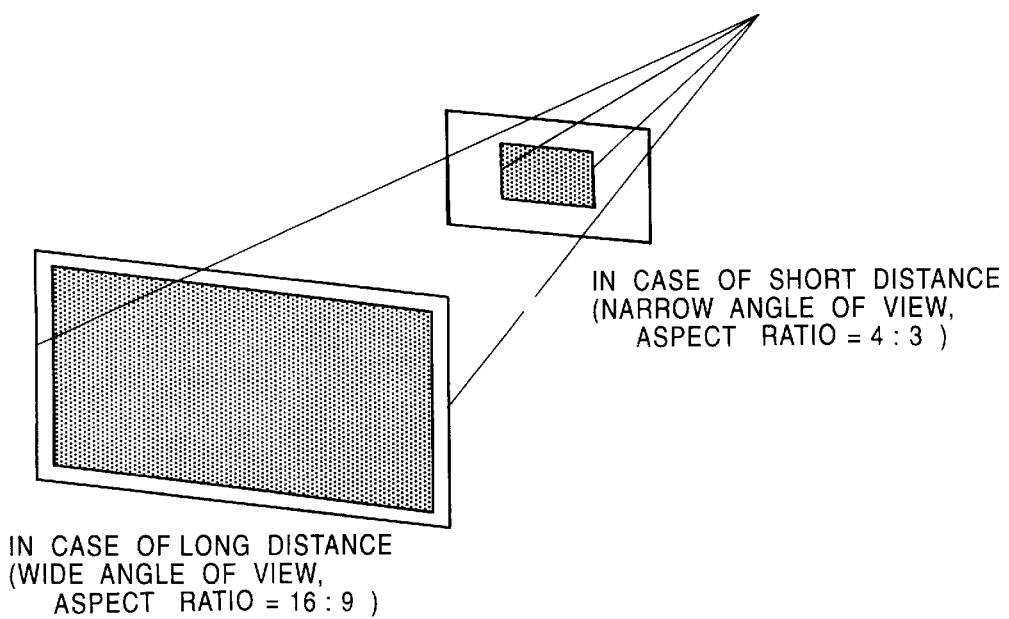
FIG. 8 is a view showing states in which an virtual image is displayed while the distance between the image and a user is changed.

More specifically, when an image is provided by, e.g., high-definition television broadcast, the display panel 12 is moved to a position far away from the lens 11 (11L and 11R), and the image is displayed on the entire area of the display panel 12 as shown in FIG. 7B. In this case, as shown in FIG. 8, a large virtual image having a wide angle of view and a ratio of a breadth to a length of 16:9 can be formed. In addition, when an image is obtained by an NTSC television signal, the display panel 12 is moved to a position near the lens 11, and the image is displayed on a part of the central portion of the display panel 12 as shown in FIG. 7C. In this case, as shown in FIG. 8, a relatively small virtual image having a narrow angle of view and a ratio of a breadth to a length of 4:3 can be formed.

Here, a distance to the virtual image and the size of the virtual image can also be set such that a user operates the operation button 3. However, for example, the user can also cause the image signal processor 22 to set (control) the distance and the size in accordance with an image supplied to the device.

More specifically, when an image is an image of a movie or drama having an aspect ratio of 16:9 and given by high-definition television broadcast, a large virtual image is formed at a position, e.g., a position about 15 m away from a user.

In addition, when an image is constituted by an NTSC television signal having an aspect ration of 4:3, an virtual image having an intermediate size is formed at a relatively near position, e.g., a position about 3 m away from a user. At this time, the virtual image can also be formed such that the aspect ration of the image is changed from 4:3 to 16:9 like a so-called wide television (wide television receiver).

When an image is of an output screen of an information processing device such as a computer, a relatively small virtual image can be formed at a relatively near position, e.g., a position about 0.3 m away from a user.

With the above arrangement, an virtual image having a shape which is suitable for the image can be provided to a user.

More specifically, with respect to an image of a movie and drama given by high-definition television broadcast, an virtual image of the image is formed at a position far away from a user to have a large size. In this manner, an image having the feeling of being at a live performance, a sense of distance, and power can be provided.

With respect to an image constituted by an NTSC television signal having an aspect ratio of 4:3, when an virtual image of the image is formed at a position relatively near a user to have an intermediate size, an image which does not give the user visual incongruity can be provided to the user. As a result, for example, the degree of eyestrain can be reduced.

In addition, with respect to an image of an output screen or the like of an information processing device such as a computer, when an virtual image of the image is formed at a position considerably near a user to have a relatively small size, an image in which the user can easily operate the computer or the like can be provided. As a result, for example, working efficiency can be improved.

FIG. 9 shows an electric arrangement of the portable display device shown in FIG. 5 (FIG. 6) when a distance to an virtual image and the size of the virtual image are changed in accordance with an image as described above.

An image signal processing computer 41 is designed to receive an image signal, processes the signal and to recognize whether the image signal is, e.g., a signal for high-definition television broadcast, an NTSC television signal, or a signal for a computer. In accordance with the recognition result, the image signal processing computer 41 generates an virtual image distance signal for controlling a distance of an virtual image to be formed from a user or a size control signal for controlling the size of the virtual image to supply these signals to an virtual image distance control computer 42 or a display controller 44, respectively. The image signal processing computer 41 is also designed to supply the received image signal to the display controller 44.

The image signal processing computer 41 is basically designed such that signals for left and right eyes are generated from the received image signal to output the signals. However, when image signals which are discriminated from each other for left and right eyes and correspond to a stereoscopic image using the disparity of both the eyes are received, these image signals are directly output.

The virtual image distance control computer 42 is designed to receive the virtual image distance signal from the image signal processing computer 41 and to generate an virtual image distance control signal serving as a control signal to be given to a motor drive circuit 43 in accordance with the virtual image distance signal. This virtual image distance control signal is supplied from the virtual image distance control computer 42 to the motor drive circuit 43.

The motor drive circuit 43 is designed to rotatively drive an virtual image distance control motor 45 according to the m image distance control signal from the virtual image distance control computer 42. In addition, the motor drive circuit 43 is also designed to rotatively drive the virtual image distance control motor 45 according to an operation signal supplied by operating the operation button 3. When both the virtual image distance control signal and the operation signal are supplied, the motor drive circuit 43 gives priority to one of these signals, e.g., the operation signal.

The display controller 44 is designed in the following manner. That is, the lateral and longitudinal lengths of left-eye and right-eye image signals supplied from the image signal processing computer 41 are limited (magnified or reduced) according to a size control signal supplied from the image signal processing computer 41, and these signals are supplied to the display panels 12L and 12R to be displayed thereon. In addition, the display controller 44 is designed to magnify or reduce an image signal according to an operation signal supplied by operating the operation button 3. As in the motor drive circuit 43, when both a size control signal and an operation signal are supplied to the display controller 44, the display controller 44 gives priority to one of these signals, e.g., the operation signal.

The virtual image distance control motor 45 is constituted by a stepping motor or the like, and is designed such that the display panels 12L and 12R are moved under the control of the motor drive circuit 43 as described above.

In the embodiment shown in FIG. 9, the image signal processing computer 41, the virtual image distance control computer 42, and the display controller 44 constitute the image signal processor 22 (FIG. 6).

The operation of the image signal processor 22 will be described below.

When the image signal processing computer 41 receives an image signal, the image signal processing computer 41 determines whether the image signal is an NTSC image signal, an image signal given by high-definition television broadcast, or a signal of a computer. The image signal processing computer 41 performs control corresponding to the determination result.

The determination of the image signal is made on the basis of the following method. That is, a horizonal sync signal or a vertical sync signal included in the image signal is detected to check the horizontal sync frequency or the vertical sync frequency.

When the image signal processing computer 41 determines that the received image signal is an NTSC image signal, an virtual image distance signal or a size control signal corresponding to the NTSC TV system is output to the virtual image distance control computer 42 or the display controller 44, and left-eye and right-eye image signals are output to the display controller 44.

The virtual image distance control computer 42 recognizes a distance (to be referred to as a present distance hereinafter) in which an image is formed at present. When the virtual image distance control computer 42 receives an virtual image distance signal, the virtual image distance control computer 42 calculates a difference between a distance corresponding to the virtual image distance signal and the present distance. If the difference value is not 0, the virtual image distance control computer 42 generates an virtual image distance control signal corresponding to a rotation amount of the virtual image distance control motor 45 required to move the virtual image by the difference, and the virtual image distance control computer 42 supplies the virtual image distance control signal to the motor drive circuit 43. In the motor drive circuit 43, the virtual image distance control motor 45 is rotatably driven according to the virtual image distance control signal. In this manner, the display panels 12L and 12R are moved to a predetermined position (where the virtual image is formed at a position a distance corresponding to the virtual image distance signal away from a user).

On the other hand, in the display controller 44, the left-eye or right-eye image signal is magnified or reduced to be supplied to the display panel 12L or 12R, respectively.

In this manner, the virtual image having a size corresponding to the size control signal is formed at a position a distance corresponding to the virtual image distance signal away from a user. More specifically, in this case, since the virtual image distance signal and the size control signal correspond to the NTSC television system, for example, as described above, an virtual image having an intermediate size is formed at a position relatively near the user.

On the other hand, when the image signal processing computer 41 determines that the image signal is a signal given by high-definition television broadcast, an virtual distance signal or a size control signal corresponding to high-definition television broadcast is output to the virtual image distance control computer 42 or the display controller 44, and left-eye and right-eye image signals are output to the display controller 44.

In this case, as in the case described above, an virtual image having a size corresponding to the size control signal is formed at a position a distance corresponding to the virtual image distance signal away from a user. More specifically, in this case, since the virtual image distance signal and the size control signal correspond to the high-definition broadcast, for example, as described above, an virtual image having a large size is formed at a position far away from the user.

When the image signal processing computer 41 determines that the image signal is for a computer, an virtual distance signal or a size control signal corresponding to the computer is output to the virtual image distance control computer 42 or the display controller 44, and left-eye and right-eye image signals are output to the display controller 44.

In this case, as in the case described above, an virtual image having a size corresponding to the size control signal is formed at a position a distance corresponding to the virtual image distance signal away from a user. More specifically, in this case, since the virtual image distance signal and the size control signal correspond to the computer, for example, as described above, an virtual image having a small size is formed at a position considerably near the user.

As described above, since an virtual image is provided in the form suitable for an image, a user can receive the feeling of being at a live performance, and the feeling of fatigue caused by observing an virtual image can be reduced.

In this embodiment, a distance to a position where an virtual image and a size of the virtual image are changed in accordance with the sync signal of an image. However, the distance and size (also the direction of the virtual image to be described later) can also be changed in accordance with the contents of the image. More specifically, for example, the image is subjected to pattern recognition (image recognition) to continuously recognize whether the image is an image of a landscape or a person. If the image is of a landscape, a large virtual image can be formed at a distant position. If the image is of a person, an virtual image having a size which is large to some extent can be formed at a relatively near position. In this case, for example, in the scene of a landscape, the virtual image of the landscape is formed at a distant position to have a large size, and the feeling of surrounding can be given to a user as if the user is actually present in the landscape. In addition, for example, in a scene in which a person is closed up, the virtual image of the person is formed at a relatively near position to have a size which is large to some extent, and the expression of the person can be apparently checked.

The aspect ratio of an image is detected, and, according to the detection result, a distance to a position where an virtual image is formed can be changed. More specifically, for example, when the aspect ratio is 16:9, a large virtual image is formed at a distant position; when the aspect ratio is 4:3, an virtual image having an intermediate size can be formed at a relatively near position.

An image to be displayed on the display panel 12 can be entirely magnified or reduced, and can be partially magnified or reduced. In addition, the image is magnified or reduced in only one direction of the lateral and longitudinal directions of the image, so that the aspect ratio of the image can be converted into a desired value. For example, when the image shows a landscape, the image is magnified in only the lateral direction to form an virtual image which is long in the lateral direction. In this manner, the feeling of surrounding can be given to the user.

In this embodiment, the distance to an virtual image and the size of the virtual image are changed in accordance with an image. In addition, for example, a direction in which the virtual image is formed can also be changed in accordance with the image. For example, as shown in FIG. 10, this change in direction can be realized such that an area (hatched portion in FIG. 10) in which an image is displayed on the display panel 12 is changed by the display controller 44.

In this manner, the direction in which an virtual image is formed is effectively changed in accordance with an image when a user observes the virtual image while performing some operation.

More specifically, for example, when the present invention is applied to an HMD (Head Mount Display), and a user actually cooks while observing virtual images of a cooking program, the direction in which the virtual images are formed is changed from the center to the upper left, the upper right, the lower left, or the lower right. In this case, the user can reliably work in the front direction while watching a recipe serving as an virtual image. More specifically, when the virtual image is moved from the front direction (center), the field of view in the front direction becomes wide, and the user can safely and reliably work.

Whether a program is a cooking program or not can be determined such that the image signal processing computer 41 performs pattern recognition (character recognition) to check whether characters of the name of food or the like are included in the image. In addition, the determination can be performed by the following method. That is, voice attendant on an image is recognized, and it is checked whether the voice recognition result includes the name of food or materials of the food. Furthermore, broadcast is performed such that information for indicating (recognizing) the contents of a program is superposed on a television signal for the program, and, on the basis of the information, it is checked whether the program is a cooking program. When the program is a cooking program, for example, the display controller 44 may be controlled such that the image signal processing computer 41 displays an image in an upper left direction or the like, i.e., a direction other than the front-surface direction of the user.

In this embodiment, the distance to an virtual image or the like is changed in accordance with an image. However, as described above, the distance can also be changed by operating the operation button 3.

In addition, the relationship between an image and a distance to a position where the virtual image of the image is formed is not limited to the relationship described above.

Figure 11:
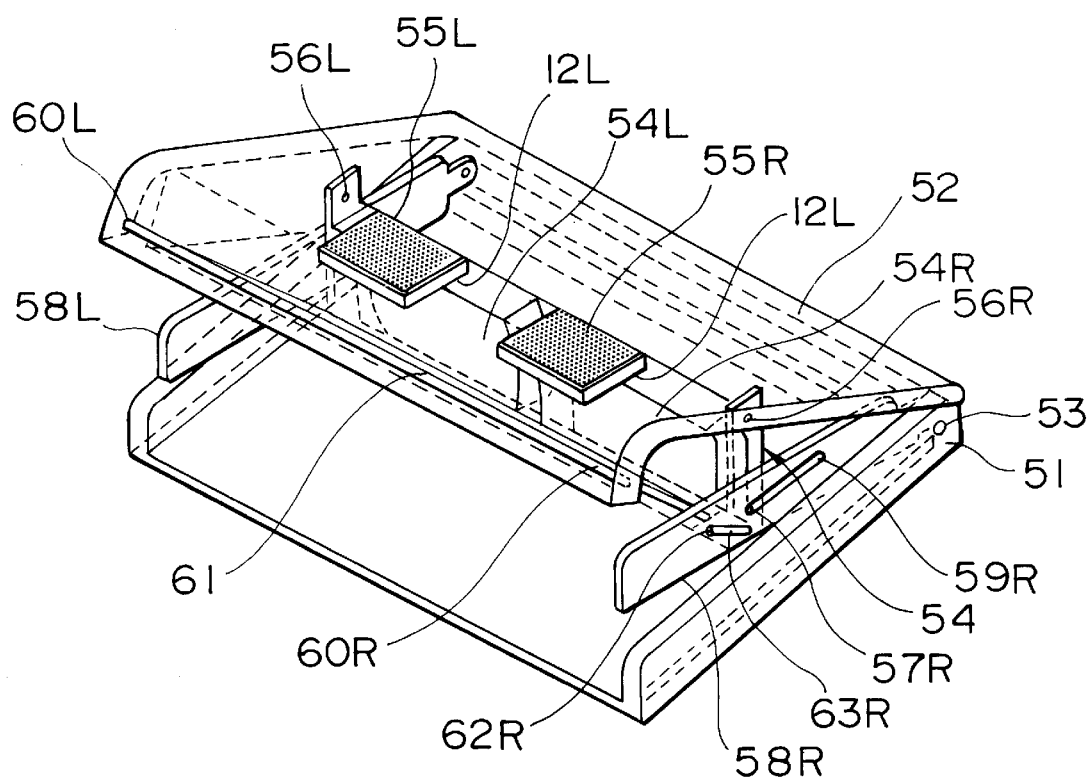
FIG. 11 is a perspective view showing the arrangement of the third embodiment of a portable display device according to the present invention.

FIGS. 11 and 12 shows the third embodiment of a portable display device to which the present invention. FIG. 11 is a perspective view of the portable display device, and FIG. 12 is a sectional view showing the right side surface of the portable display device.

In the third embodiment, as a magnification optical system for magnifying an image displayed on the display panel 12 to form an virtual image, a convex lens is not used, but a concave mirror is used.

More specifically, an upper cover 52 is arranged on a lower cover 51 such that the upper cover 52 can be pivoted about a pin 53. A guide plate 58L or 58R is attached to the left or right side surface of the inside of the lower cover 51, respectively, such that the guide plate 58L or 58R can be pivoted about the pin 53.

Guide holes 59R and 63R are formed in the guide plate 58R. Although not shown in FIGS. 11 and 12, a guide hole 59L or 63L similar to the guide hole 59R or 63R is formed in the guide plate 58L.

A half-mirror 61 having a reflecting surface formed in the upper surface direction is attached to the side, opposing the side connected to the lower cover 51, of the upper cover 52 such that the half-mirror 61 can be pivoted about rotating pins 60L and 60R arranged on the left and right sides of the upper portion of the half-mirror 61. A guide pin 62R is formed on the right side of the lower portion of the half-mirror 61, and the guide pin 62R passes through the guide hole 63R of the guide plate 58R. Although not shown in FIGS. 11 and 12, a guide pin 62L similar to the guide pin 62R is formed on the left side of the lower portion of the half-mirror 61, and the guide pin 62L passes through the guide hole 63L of the guide plate 58L.

A concave mirror unit 54 in which the concave mirrors 54L and 54R are formed is attached to a position of the upper cover 52 behind the position where the half-mirror 61 is attached in the rear-surface direction. More specifically, the concave mirror unit 54 is attached to the left or right side surface of the inside of the upper cover 52 by using the rotating pin 56L or 56R, and the concave mirror unit 54 can be pivoted about the rotating pins 56L and 56R.

The guide pin 57R is formed on the right side of the lower portion of the concave mirror unit 54, and the guide pin 57R passes through the guide hole 59R of the guide plate 58R. Although not shown in FIGS. 11 and 12, a guide pin 57L similar to the guide pin 57R is formed on the left side of the lower portion of the concave mirror unit 54, and the guide pin 57L passes through the guide hole 59L of the guide plate 58L.

The display panels 12L and 12R are fixed toward the bottom surface at a position near the center between the position where the half-mirror 61 is attached and the position where the concave mirror unit 54 is attached. The display panels 12L and 12R, as shown in FIG. 12B, are fixed such that the display screens of the display panels 12L and 12R are perpendicular to the principal plane of the concave mirrors 54L and 54R when the upper cover 52 is opened.

A hole is formed in a portion, on which the display panel 12L or 12R is formed, of the upper cover 52, and a diffusion plate (external light receiving diffusion plate) 55L or 55R is arranged on the display panel 12L or 12R, respectively. In this manner, external light diffused by the diffusion plate 55L or 55R is incident on the display panel 12L or 12R, respectively.

Here, in the third embodiment, on the display panel 12L or 12R, an image is displayed by using external light diffused by the diffusion plate 55L or 55R, respectively. More specifically, in the third embodiment, the display panels 12L and 12R are designed such that images are displayed by changing amounts of transmission of external light.

In contrast to this, in the first and second embodiment, amounts of transmission of light from a general back light are changed by the display panels 12L and 12R constituted by liquid-crystal bulbs or the like.

In the first and second embodiments, as described above, an image can be displayed by, in addition to a transmitted light control device for displaying an image by controlling of transmission of light, for example, a spontaneous emission device for displaying an image by a light-emitting element (e.g., light-emitting diode or the like) which emits beams of light in units of pixels, a reflected light control device for displaying an image by controlling the reflection of light, or the like.

In the third embodiment, external light is not used, but the above devices are used, so that an image can be displayed. Furthermore, so-called back light and external light can also be used at once. More specifically, external light can also be supplementarily used.

The image signal processor 22 in the third embodiment, as shown in FIG. 12, is closer to the rear surface than that in the first embodiment.

Figure 12A:
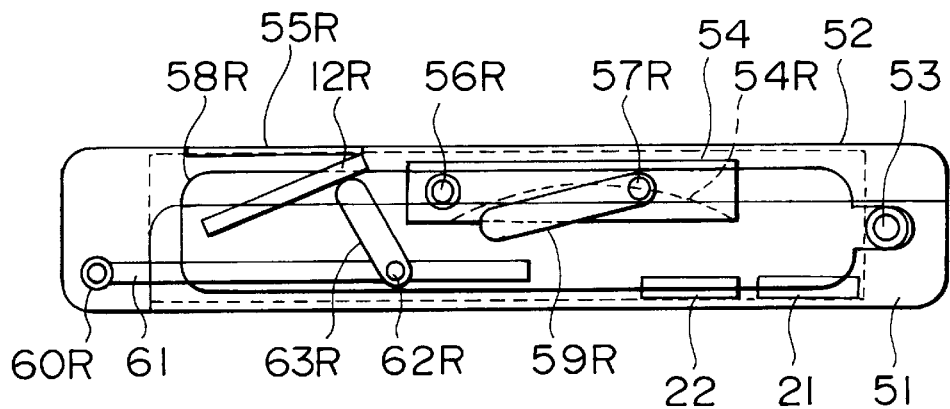
FIG. 12, consisting of FIGS. 12A and 12B, is a sectional view showing the arrangement of the third embodiment of the portable display device according to the present invention.
Figure 12B:
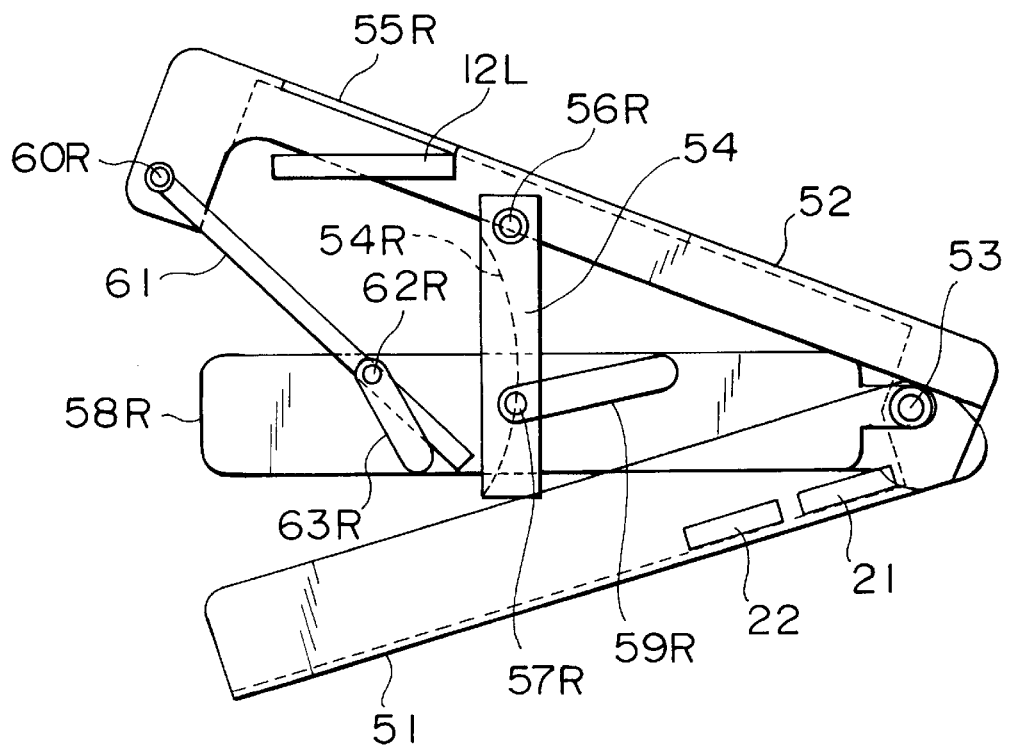

In the portable display device arranged as described above, when the upper cover 52 is closed, as shown in FIG. 12A, the guide pin 62R (in the same way as the guide pin 62L) is located at the end of the guide hole 63R in the bottom surface direction. In this manner, the half-mirror 61 is accommodated on the bottom surface side while the half-mirror 61 is parallel to the upper surface and the bottom surface.

At this time, the guide pin 57R (in the same way as the guide pin 57L) is located at the end of the guide hole 59R on the rear-surface direction. In this manner, the concave mirror unit 54 is accommodated such that the principal plane of the concave mirrors 54L and 54R are parallel to the upper surface and the bottom surface, i.e., in a laid state. Note that the concave mirror unit 54 is accommodated on the upper surface side, thereby preventing the concave mirror unit 54 from being in contact with the half-mirror 61 accommodated on the bottom surface side.

As described above, when the upper cover 52 is closed, the concave mirror unit 54 and the half-mirror 61 are arranged in a laid state and accommodated in the device.

When the upper cover 52 is opened, as shown in FIGS. 11 and 12B, the half-mirror 61 is lifted up (raised up) by opening the upper cover 52 while the half-mirror 61 is pivoted about the rotating pins 60L and 60R. In this manner, the guide pin 62R (in the same way as the guide pin 62L) moves along the guide hole 63R. When the guide pin 62R reaches the end of the guide holes 59R and 63R in the upper surface direction, the guide plate 58R (in the same way as the guide plate 58L) is lifted up by the guide pin 62R about the pint 53.

By opening the upper cover 52, not only the half-mirror 61 but also the concave mirror unit 54 are lifted up while the concave mirror unit 54 is pivoted about the rotating pins 56L and 56R. In this manner, the guide pin 57R (in the same way as the guide pin 57L) moves along the guide hole 59R.

Thereafter, when an angle formed by the guide plate 58R and the lower cover 51 becomes a predetermined angle, the upper cover 52 is locked (for example, the upper cover 52 is locked such that a projection portion (not shown) is fitted in a recessed portion (not shown)).

At this time, the guide pin 57R reaches the end of the guide hole 59R in the front-surface direction, so that the concave mirror unit 54 is arranged in a state (rise state) in which the principal plane of the concave mirrors 54L and 54R formed in the concave mirror unit 54 are perpendicular to the display screens of the display panels 12L and 12R. The half-mirror 61 is arranged such that light serving as an image displayed on the display panel 12L or 12R is reflected at 90° to be incident on the concave mirror 54L or 54R, respectively.

In this state, an image (video image) serving as information is displayed on the display panel 12L or 12R, i.e., the transmittance of the display panel 12L or 12R is controlled in accordance with an image, and external light diffused by the diffusion plate 55L or 55R is transmitted through the display panel 12L or 12R. In this case, an image serving as each transmitted light is reflected by the half-mirror 61 at 90° to be incident on the concave mirror 54L or 54R. In the concave mirrors 54L and 54R, the images from the half-mirror 61 are reflected at 180° to be magnified, thereby forming virtual images. These virtual images are observed through the half-mirror 61.

From the state shown in FIG. 11 or 12B, when the concave mirror unit 54 and the half-mirror 61 are accommodated as shown in FIG. 12A, the upper cover 52 may be pressed downward with predetermined force. In this case, the upper cover 52 is unlocked, the upper cover 52 is pivoted in the bottom surface direction. With this pivotal movement, the guide plates 58L and 58R are pivoted in the bottom surface direction. In addition, in contrast to the case described above, the guide pin 57R or 62R moves in the rear-surface direction or the bottom surface direction along the guide hole 59R or 63R, respectively, and the concave mirror unit 54 and half-mirror 61 gradually fall. When the upper cover 52 is completely closed, the upper cover 52 is locked at this position. In this manner, as shown in FIG. 12A, the upper cover 52 is kept closed.

A concave lens can be made smaller in weight than a convex lens. Therefore, in this case, the device can be reduced in weight.

Figure 13:
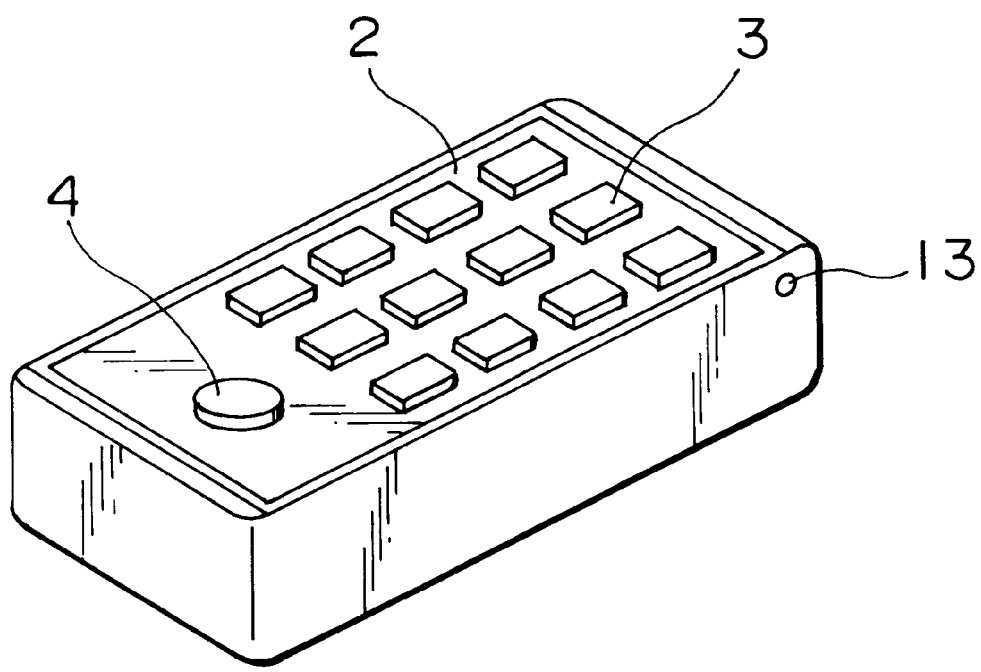
FIG. 13 is a perspective view showing the arrangement of the fourth embodiment of a portable display device according to the present invention.
Figure 14:
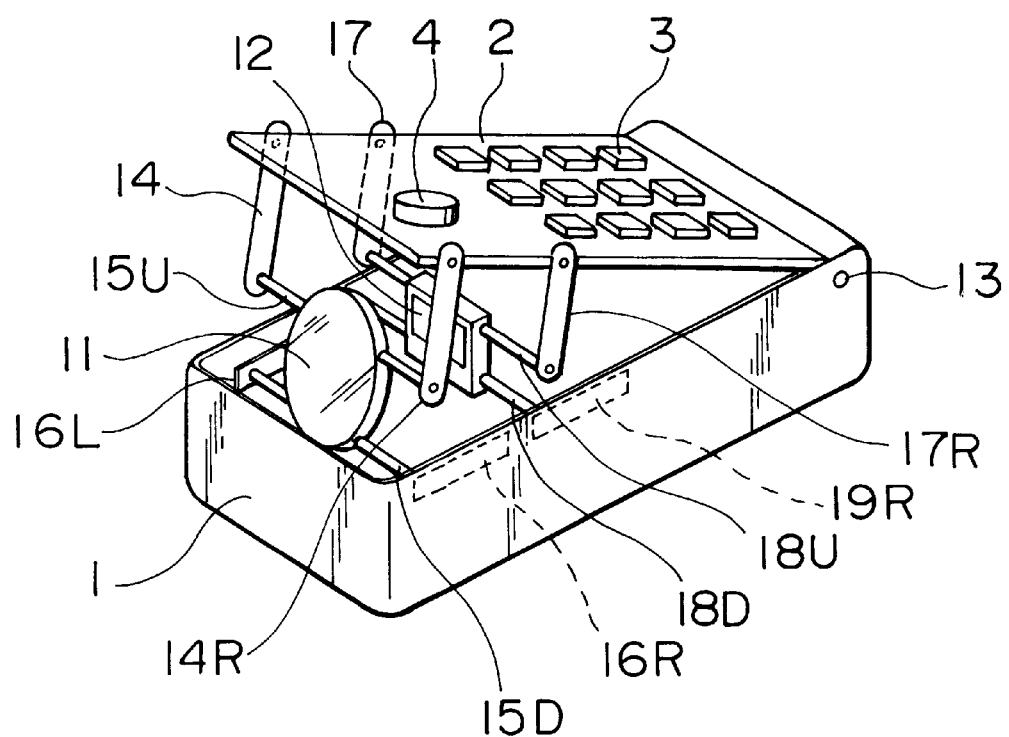
FIG. 14 is a sectional view showing the arrangement of the fourth embodiment of the portable display device according to the present invention.

FIGS. 13 and 14 are perspective views showing the fourth embodiment of a portable display device according to the present invention. The same reference numerals as in FIG. 1 or 2 denote the same parts in FIG. 13 or 14.

More specifically, in the first embodiment described in FIGS. 1 and 2, the lens 11L and the display panel 12L which are to form an virtual image observed by the left eye of a user and the lens 11R and the display panel 12R which are to form an virtual image observed by the right eye are arranged. However, in the fourth embodiment, only one of these sets is arranged.

Therefore, in this case, although only one of the left and right eyes can observe an virtual image, the device can be further reduced in size.

Figure 15:
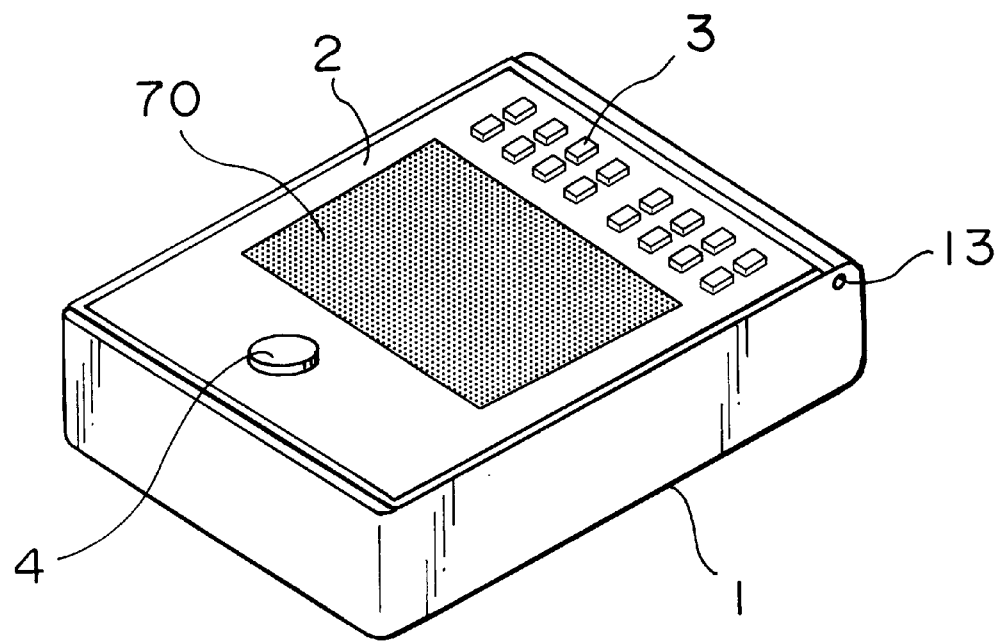
FIG. 15 is a perspective view showing the arrangement of the fifth embodiment of a portable display device according to the present invention.

FIG. 15 is a perspective view showing the fifth embodiment of a portable display device according to the present invention. The same reference numerals as in FIG. 1 denote the same parts in FIG. 15.

More specifically, in the fifth embodiment, in addition to an operation button 3, a display panel 70 is arranged on a cover 2. The display panel 70 is designed to display the same images as those displayed on the display panels 12L and 12R (not shown in FIG. 15) accommodated in a housing 1. Therefore, even if the cover 2 is not opened, a user can check the contents of information by displaying the information on the display panel 70.

Figure 16A:
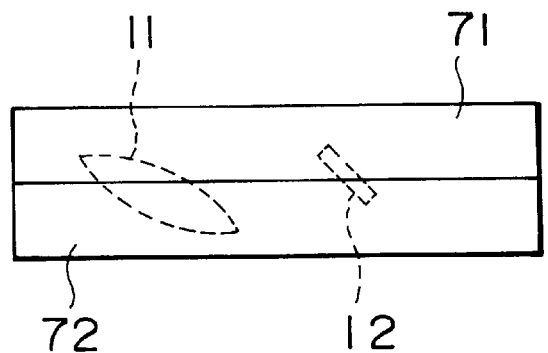
FIG. 16, consisting of FIGS. 16A to 16C, is a side view showing the arrangement of the sixth embodiment of the portable display device according to the present invention.
Figure 16B:
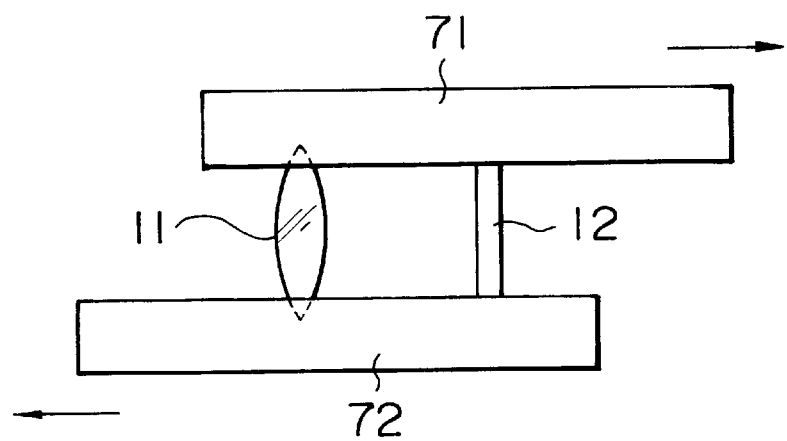
Figure 16C:
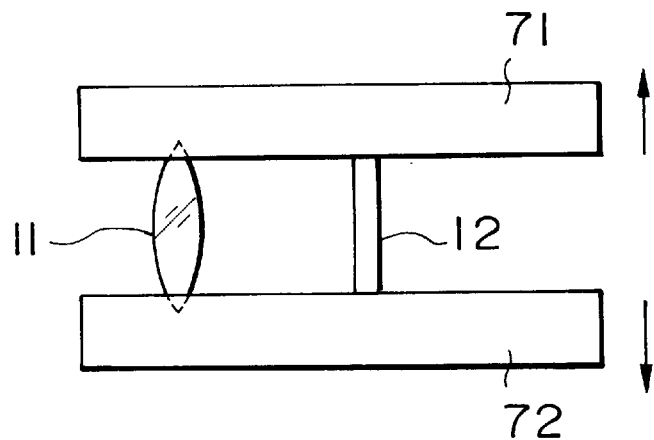

In the above embodiment, a mechanism in which a magnification optical system is exposed by pivoting (opening) the cover 2 or the upper cover 52 is used. However, the following mechanism can also be used. That is, for example, as shown in FIG. 16A, when a magnification optical system (lens 11 in this case) is accommodated in a housing constituted by an upper lid 71 and a lower lid 72, the upper lid 71 and the lower lid 72 are slidably drawn as shown in FIG. 16B, or the upper lid 71 or the lower lid 72 is drawn upward or downward as shown in FIG. 16C, so that the magnification optical system is exposed.

Figure 17A:
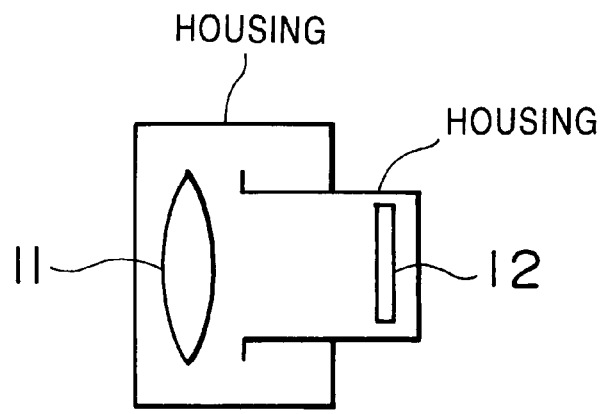
FIG. 17, consisting of FIGS. 17A and 17B, is a sectional view showing an arrangement of a portable display device in which the distance between a lens 11 and a display panel 12 is made changeable.
Figure 17B:
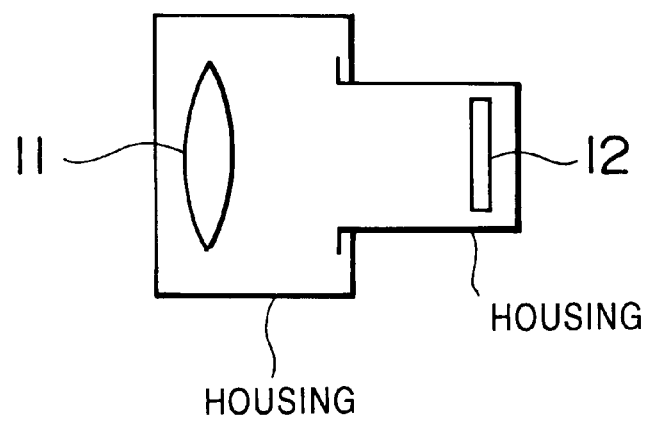

From the viewpoint of a reduction in size of a device, for example, as shown in FIG. 17, a mechanism in which the distance between the lens 11 and the display panel 12 is made changeable may be used.

In the above embodiment, although the communication function unit 21 and the image signal processor 22 are arranged inside the housing, these units may be arranged out of the housing.

Figure 18:
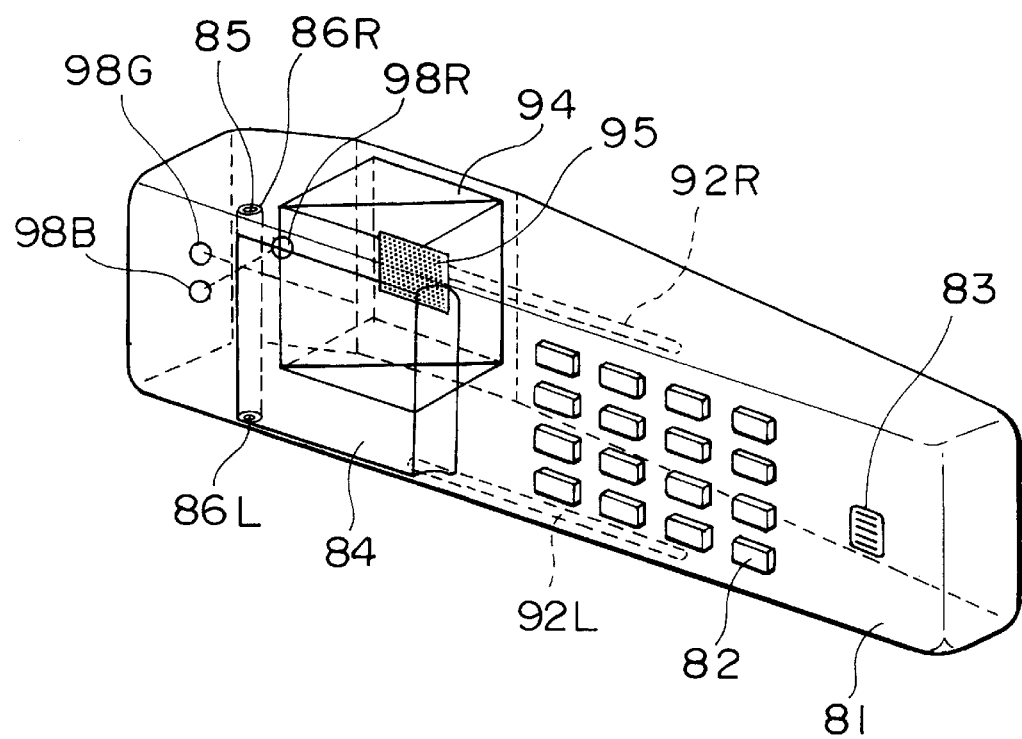
FIG. 18 is a perspective view showing the arrangement of the seventh embodiment of a portable display device according to the present invention.
Figure 19:
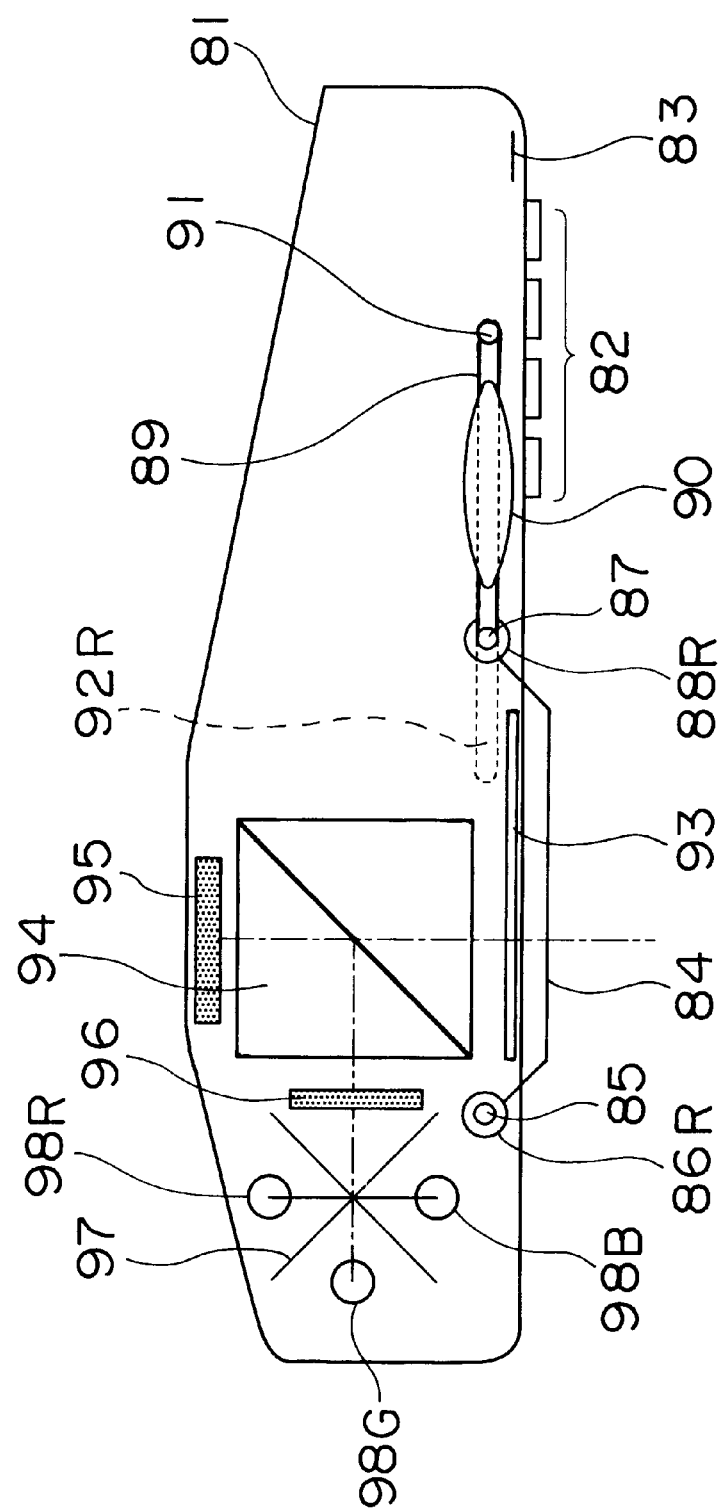
FIG. 19 is a sectional view showing the arrangement of the seventh embodiment of the portable display device according to the present invention.
Figure 20:
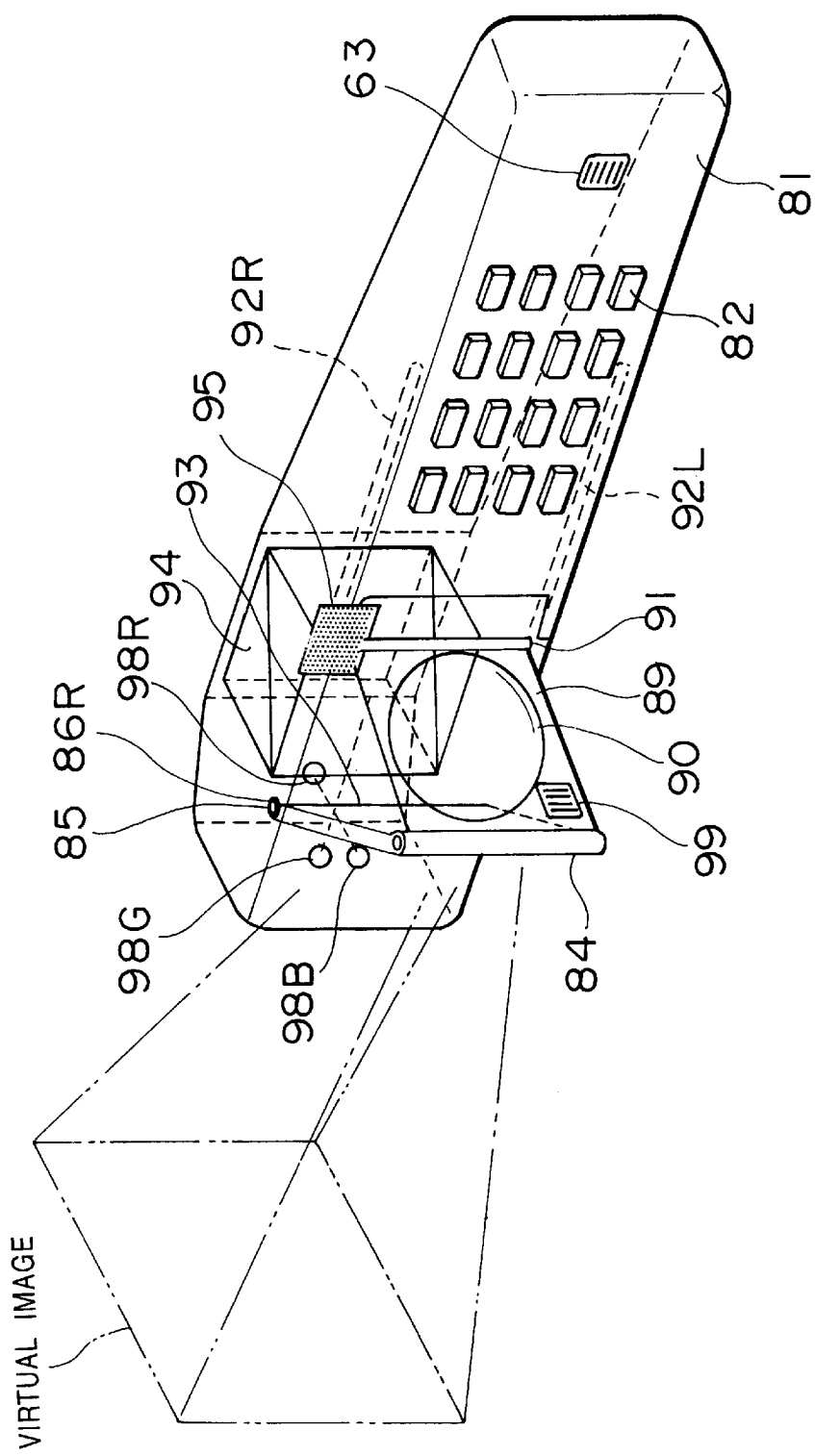
FIG. 20 is a perspective view showing the arrangement of the seventh embodiment of the portable display device according to the present invention.
Figure 21:
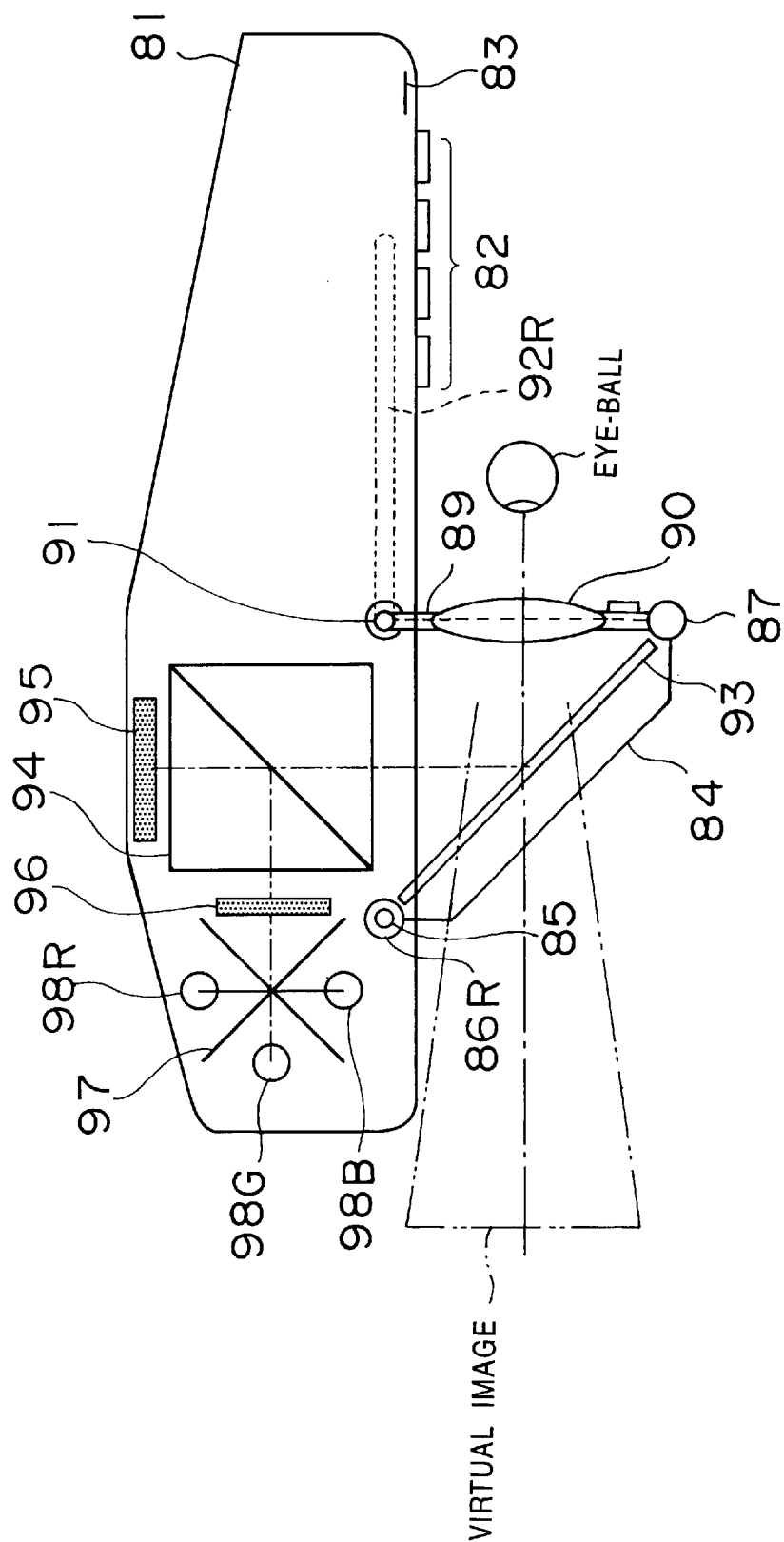
FIG. 21 is a sectional view showing the arrangement of the seventh embodiment of the portable display device according to the present invention.

FIGS. 18 to 21 show the arrangement of still another embodiment of a portable display device according to the present invention. FIGS. 18 and 20 are perspective views showing the portable display device, and FIGS. 19 and 21 are sectional views of the right side surface of the portable display device (sectional views when viewed in the right surface direction).

In the portable display device, when the portable display device is used (in a non-use state), a mirror cover 84 is in a closed state as shown in FIGS. 18 and 19, thereby making the portability of the portable display device easy. When the portable display device is used (in a use state), the mirror cover 84 is opened as shown in FIGS. 20 and 21, thereby setting a lens 90 in an exposure state. When the lens 90 is set in an exposure state, for example, an image (video image) serving as information displayed on a reflection-type display panel (reflection-type image display panel) 95 for reflecting light from a light source to display an image is magnified by the lens 90 to form an virtual image. The virtual image is provided to a user.

More specifically, in the non-use state, as shown in FIGS. 18 and 19, the mirror cover 84 is closed, and the lens 90 (and a reflecting mirror 93 (to be described later)) is set in an accommodation state in which the lens 90 is accommodated in a housing 81 having a shape like that of a portable telephone set.

On the front surface of the housing 81, the mirror cover 84, an operation button 82 for outputting commands of various processes to the portable display device or inputting required information, and a loudspeaker 83 for outputting voice are sequentially arranged from the upper portion of the housing 81.

On the inner-side surface of the housing 81 of the mirror cover 84, a reflecting mirror 93 having an reflecting surface facing the inside of the housing 81 is arranged. In addition, a reflecting mirror rotating pin 85 is arranged above the mirror cover 84, and the left end or right end of the reflecting mirror rotating pin 85 passes through a reflecting mirror rotating hole 86L or 86R formed in the left or right side surface of the housing 81. In this manner, the mirror cover 84 is pivoted (opened/closed) about the reflecting mirror rotating pin 85.

A lens rotating pin 87 is attached to the side, opposing the side to which the reflecting mirror rotating pin 85 is attached, of the mirror cover 84 such that the lens rotating pin 87 is parallel to the reflecting mirror rotating pin 85. The right end of the lens rotating pin 87 passes though a lens rotating hole 88R formed on the right side surface of a lens holder 89 which holds the lens 90. Although not shown in FIGS. 18 to 21, the left end of the lens rotating pin 87 also passes through a lens rotating hole 88L formed in the left side surface of the lens holder 89. In this manner, the lens holder 89 can be pivoted about the lens rotating holes 88L and 88R serving as pivotal centers.

A lens slide pin 91 is arranged on the side, opposing the side on which the lens rotating holes 88L and 88R are arranged, of the lens holder 89. The left end or right end of the lens slide pin 91 passes through a slide groove 92L or 92R vertically formed on the left side surface or right side surface of the inside of the housing 81. In this manner, the lens slide pin 91 can be vertically slid along the slide grooves 92L and 92R.

A reflecting mirror 93 formed on the mirror cover 84 is attached such that the reflecting mirror 93 is parallel to the front surface of the housing 81 when the mirror cover 84 is closed. A PBS (polarizing beam splitter) 94 is arranged on the inner side of the reflecting mirror 93 in the housing 81, and the display panel 95 is arranged at a position opposing the reflecting mirror 93 through the PBS 94. A diffuser 96, a dichroic mirror 97, and light-emitting diodes 98R, 98G, and 98B which respectively emits a red beam of light, a green beam of light, or a blue beam of light are arranged above the PBS 94.

In the portable display device arranged as described above, when the mirror cover 84 is closed, as shown in FIGS. 18 and 19, the lens slide pin 91 is located at the end of the housing 81 in the downward direction along the slide grooves 92L and 92R. In addition, in this case, the lens rotating pin 87 is arranged at a position having a height equal to that of the slide grooves 92L and 92R. In this manner, the lens 90 held by the lens holder 89 is arranged such that the optical axis of the lens 90 is perpendicular to the mirror cover 84 (the principal plane of the lens 90 is parallel to the mirror cover 84).

When the mirror cover 84 is closed as described above, the lens 90 is arranged in a laid state and accommodated in the housing 81.

When the mirror cover 84 is opened (when the mirror cover 84 is pivoted about the reflecting mirror rotating pin 85 serving as a pivotal center), the lens rotating pin 87 is lifted up. In this manner, the lens holder 89 is lifted up while the lens holder 89 is pivoted about the lens rotating holes 88L and 88R serving as pivotal centers. In addition, when the lens holder 89 is lifted up, the lens slide pin 91 moves upward along the slide grooves 92L and 92R.

Thereafter, when an angle formed by the loudspeaker 83 and the front surface of the housing 81 becomes about 45° by opening the mirror cover 84, the lens slide pin 91 reaches the ends of the slide grooves 92L and 92R in the upward direction. In this manner, the mirror cover 84 is locked in a state in which an angle formed by the optical axis of the lens 90 held by the lens holder 89 and the reflecting surface of the reflecting mirror 93 becomes about 45°.

More specifically, the state of the lens 90 is changed from the laid state shown in FIGS. 18 and 19 to the rise state shown in FIGS. 20 and 21.

In this state, a user brings his/her right ear close to the loudspeaker 83 and looks through the lens 90 with his/her right eye, so that he/she can observe an virtual image.

Figure 22:
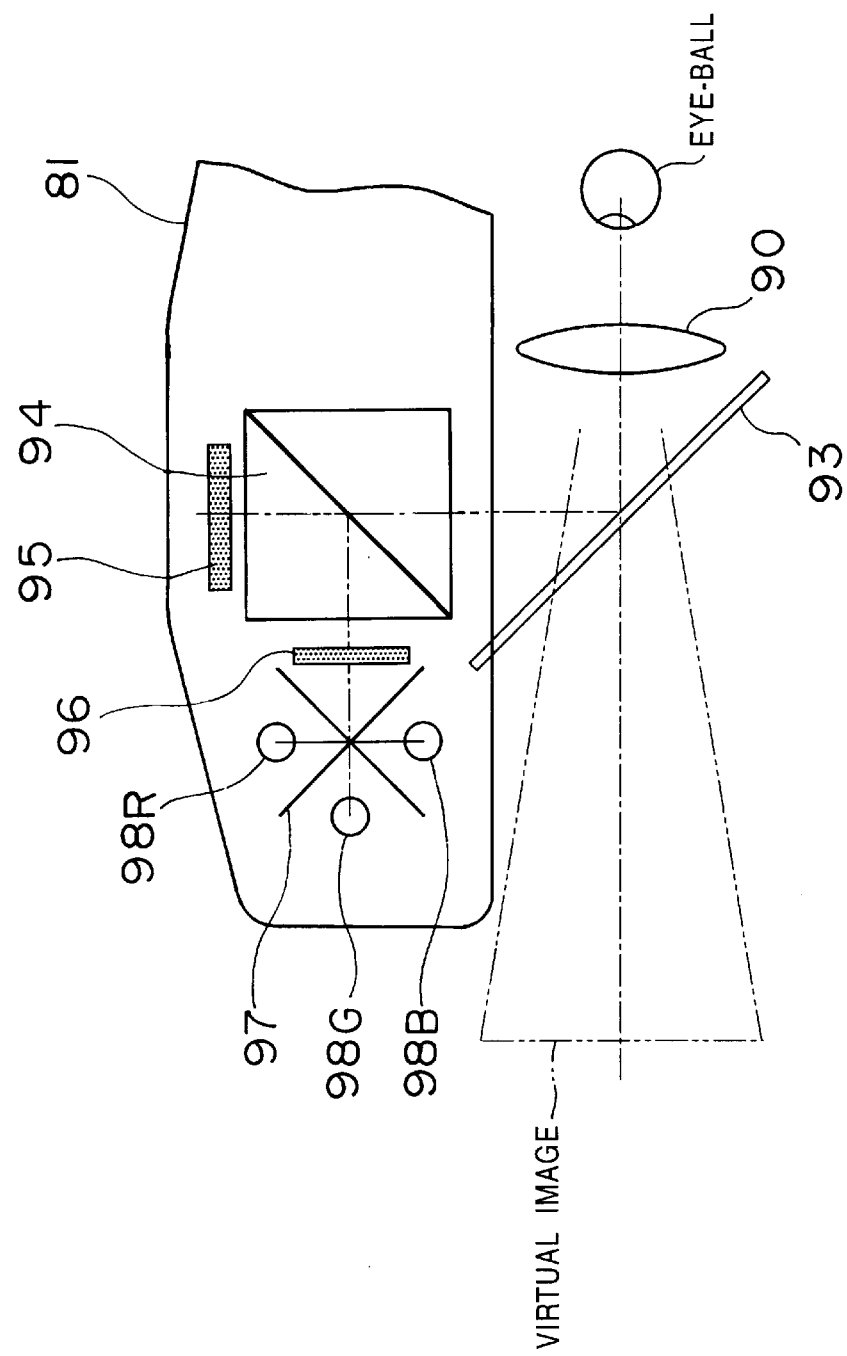
FIG. 22 is a sectional view showing the arrangement of an optical system of the seventh embodiment of the portable display device.

More specifically, FIG. 22 shows a schematic view of an optical system in a case wherein the portable display device is set in the state shown in FIGS. 20 and 21.

Respective beams emitted from the light-emitting diodes 98R, 98G, and 98B are incident on the PBS 94 through the dichroic mirror 97 and the diffuser 96. In the PBS, a beam of light which is incident on the PBS through the diffuser 96 is reflected at 90° and irradiated on the display panel 95. In the display panel 95, the beam of light which is incident on the display panel 95 is reflected according to an image signal to be displayed, and the reflected beam of light is incident on the reflecting mirror 93 through the PBS 94. In the reflecting mirror 93, the image irradiated as the reflected beam of light from the display panel 95 through the PBS 94 is reflected at 90°, and is incident on an eye-ball of a user. In this manner, in the eye-ball of the user, an virtual image corresponding to the image displayed on the display panel 95 is observed.

This portable display device has a communication function (to be described later). On the lens holder 89, as shown in FIG. 20, a microphone 99 is arranged at a position where the microphone 99 can receive voice of a user when the user brings his/her right ear close to the loudspeaker 83 and looks through the lens 90 with his/her right eye. In this manner, the user can perform telephone communication or the like with another user by using the communication function while observing an virtual image. More specifically, in this case, voice generated by the user is received by the microphone 99, and voice from another user is output form the loudspeaker 83.

From the state shown in FIG. 20 or 21, when the lens 90 is accommodated in the housing 81 as shown in FIGS. 18 and 19, the mirror cover 84 may be pressed inward to be closed. In this case, the lens slide pin 91 moves in the downward direction of the housing 81 in contrast to the above case. In this manner, the lens 90 gradually falls together with the lens holder 89 for holding the lens 90. When the mirror cover 84 is pressed to the position of the front surface of the housing 81, the mirror cover 84 is locked. In this manner, as shown in FIGS. 18 and 19, the mirror cover 84 is kept closed.

Figure 23:
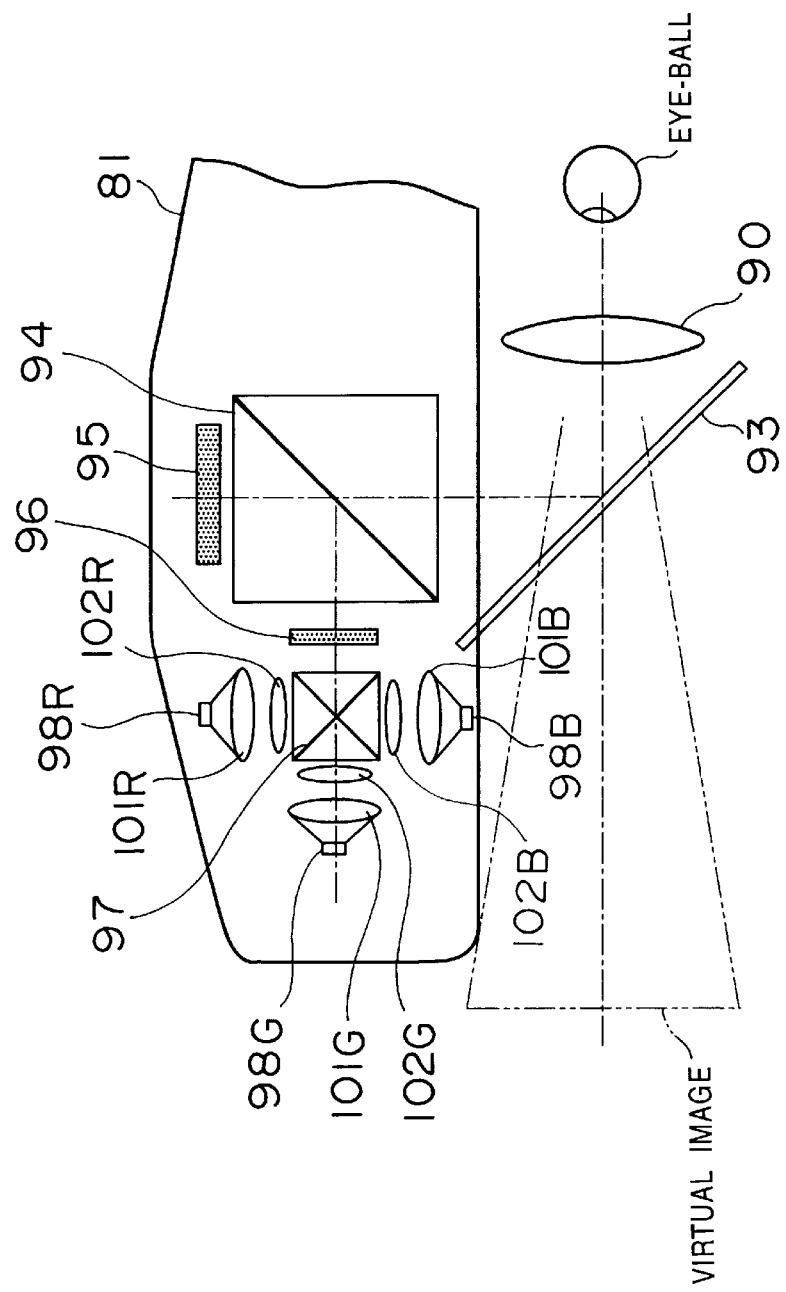
FIG. 23 is a sectional view showing a more detailed arrangement of the optical system of the seventh embodiment of the portable display device.

FIG. 23 shows a detailed arrangement of the optical system in the embodiment shown in FIGS. 18 to 21.

A red beam of light emitted from the light-emitting diode 98R passes through a red relay lens 101R and a red field lens 102R to adjust the direction of the red beam, and the red beam is incident on the dichroic prism (mirror) 97. A green or blue beam of light emitted from the light-emitting diode 98G or 98B passes through a green relay lens 101G and a green field lens 102G or a blue relay lens 101B and a blue field lens 102B to adjust its direction, respectively, and the blue or green beam is incident on the dichroic mirror 97. As in the above case, an virtual image is observed in an eye-ball of a user.

In the embodiment shown in FIGS. 18 to 21, since a red, green, or blue beam of light emitted from the light-emitting diode 98R, 98G, or 98B is irradiated on the display panel 95 to be reflected, a color image is displayed on the display panel 95. Here, as a method of displaying a color image, a so-called field sequential method in which a red, green, or blue beam or light is irradiated in a time-sharing manner to display a color image is employed.

Figure 24:
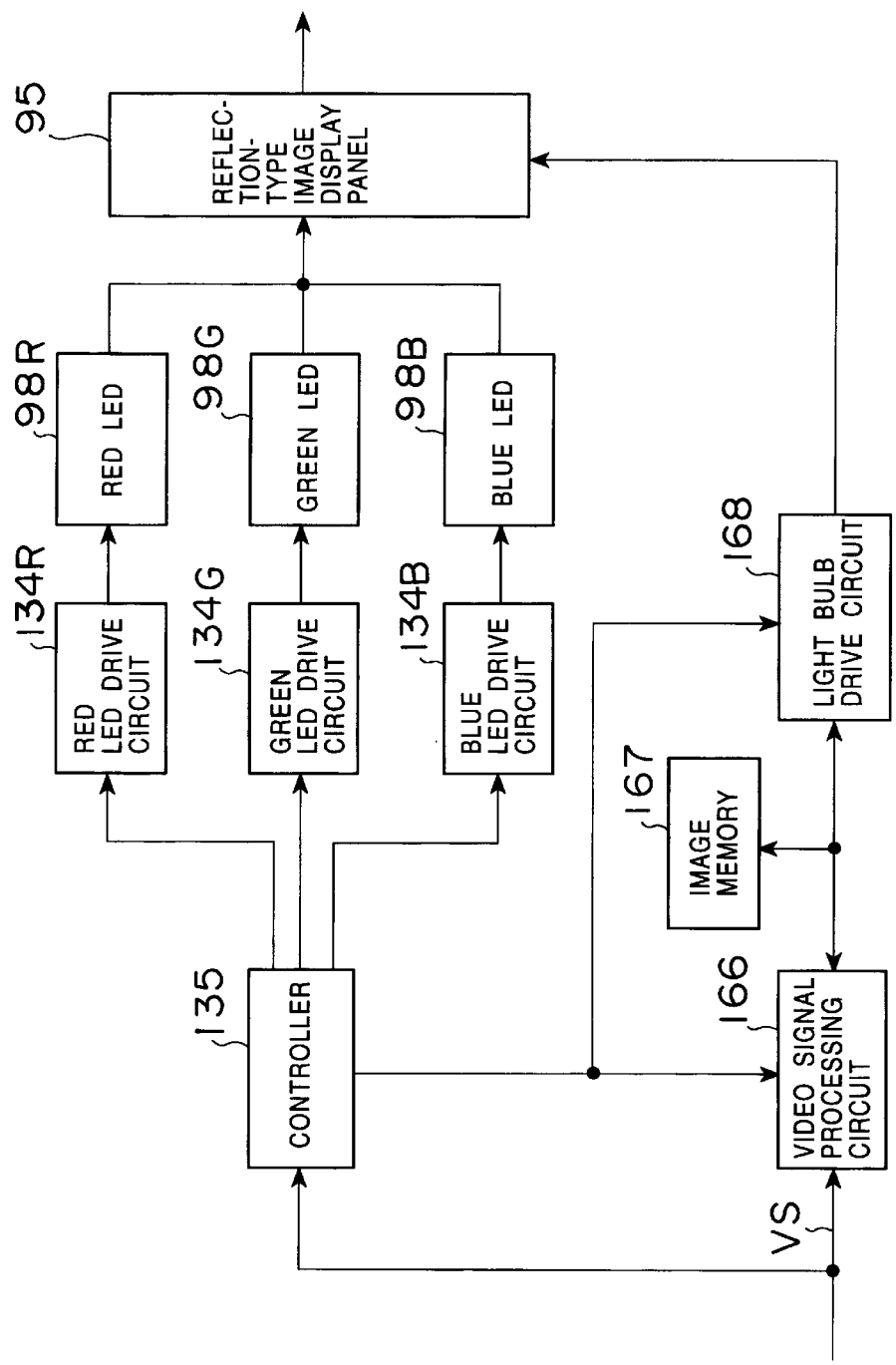
FIG. 24 is a block diagram showing an arrangement of a circuit for displaying a color image by a field sequential scheme.

FIG. 24 shows an arrangement of a circuit for displaying a color image by the field sequential method.

A controller 135 is designed to receive an image signal (color image signal) VS to be provided to a user. The controller 135 controls LED (light-emitting diode) drive circuits 134R, 134G, and 134B, a video signal processing circuit 166, and a light bulb drive circuit 168 in accordance with the image signal VS. The video signal processing circuit 166 is designed to receive an image signal VS to be provided to a user. The video signal processing circuit 166 is designed to generate a red image, a green image, or a blue image corresponding to a red, green, or blue component from the image signal VS. The red image, the green image, and the blue image generated by the video signal processing circuit 166 are supplied to an image memory 167 to be stored therein. The light bulb drive circuit 168 controls (drives) the display panel 95 under the control of the controller 135 on the basis of a value stored in the image memory 167. The LED drive circuits 134R, 134G, and 134B drive the light-emitting diodes (LEDs) 98R, 98G, and 98B under the control of the controller 135, respectively.

Figure 25:
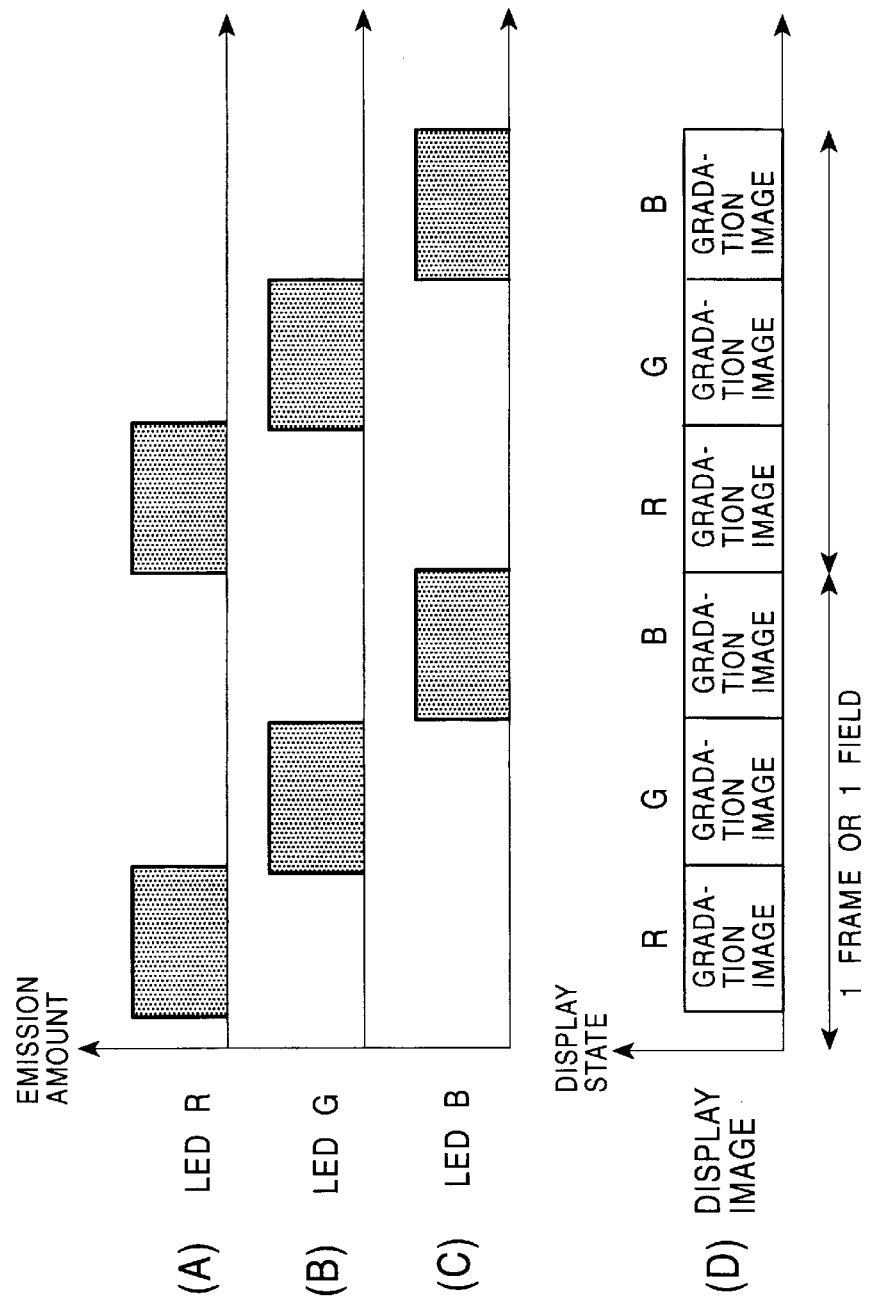
FIG. 25 is a timing chart for explaining the operation of the circuit in FIG. 24.

The operation of this circuit will be described with reference to the timing chart in FIG. 25.

The controller 135 generates a timing signal for a 1-frame or 1-field period into three periods in synchronism with the image signal VS input to the controller 135 to supply the timing signal to the video signal processing circuit 166 and the light bulb drive circuit 168. The video signal processing circuit 166 generates a red image, a green image, and a blue image from the image signal VS input to the video signal processing circuit 166, and sequentially outputs these images in synchronism with the timing signal from the controller 135. The red image, the green image, or the blue image output from the video signal processing circuit 166 is supplied to the image memory 167 to be temporarily stored therein.

The light bulb drive circuit 168 sequentially reads the red image, the green image, and the blue image stored in the image memory 167 in synchronism with the timing signal from the controller 135, and controls reflectances of respective pixels constituting the display panel 95 according to the images. In this manner, in the display panel 95, as shown in FIG. 25D, red, green, and blue images each having a corresponding gradation are displayed in the three periods obtained by dividing a 1-frame or 1-field period by three, respectively.

On the other hand, the controller 135 controls the LED drive circuits 134R, 134G, and 134B to sequentially turn on the light-emitting diodes 98R, 98G, and 98B in synchronism with the timings at which the red image, the green image, and the blue image are displayed, respectively. As a result, as shown in FIGS. 25A to 25C, the light-emitting diodes 98R, 98G, and 98B are turned on at the timings at which the display panel 95 displays the red image, the green image, and the blue image, and red, green, and blue beams of light are irradiated on the display panel 95.

As described above, in the display panel 95, the red image, the green image, and the blue image are sequentially switched to be displayed. However, a user recognizes these images as a color image because of a so-called after-image effect.

When a color reflection-type image display panel is used as the display panel 95, the three light-emitting diodes 98R, 98G, and 98B which respectively emit red, green, and blue beams of light are not required, and only one diode emitting white light or one fluorescent display tube and another light source may be satisfactorily used. A method of displaying a color image is not limited to the method described above.

Figure 26:
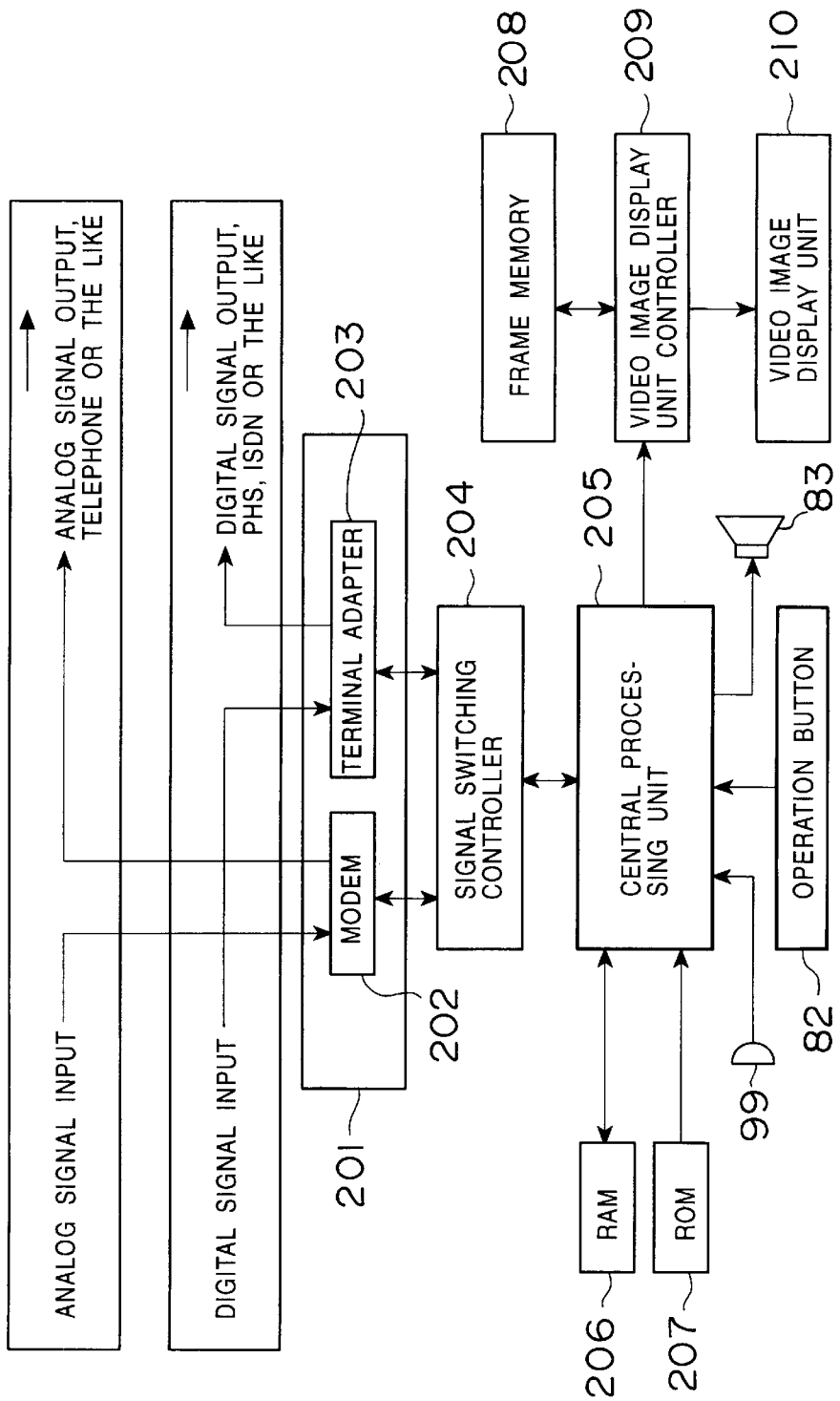
FIG. 26 is a block diagram showing an electric arrangement of the seventh embodiment of the portable display device.
Figure 27:
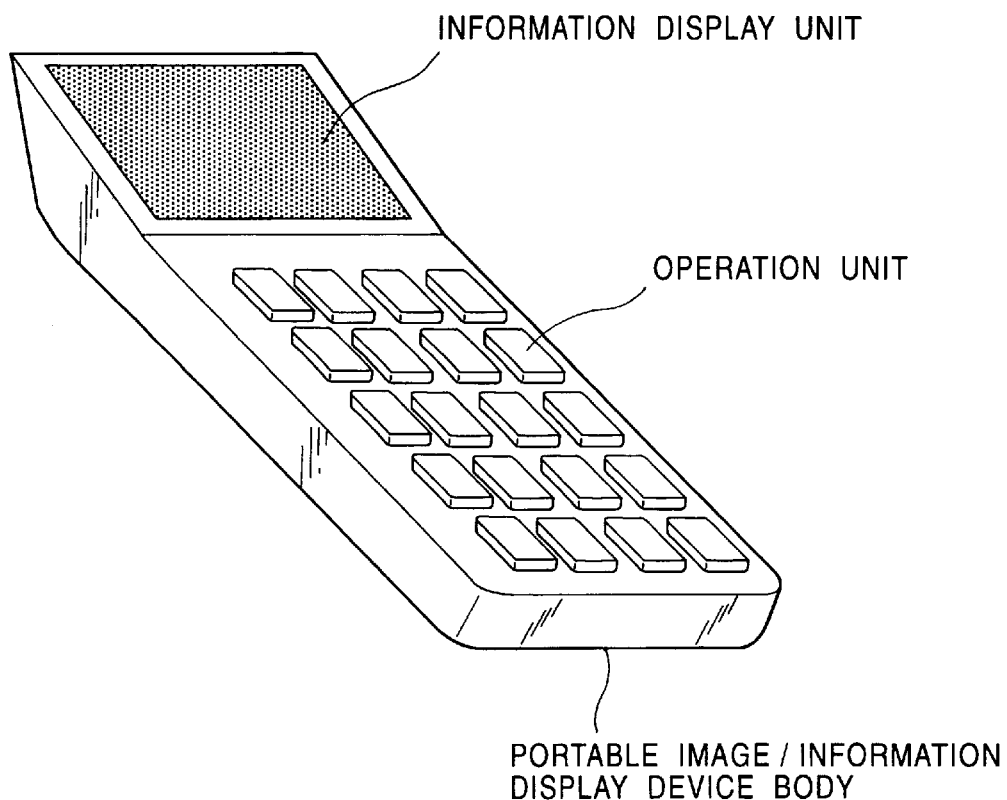
FIG. 27 is a perspective view showing an arrangement of a conventional portable display device.

FIG. 26 shows an electric arrangement of the portable display device shown in FIGS. 18 to 21.

A communication function unit 201 is designed to control communication with various information processing devices each having a communication function. More specifically, the communication function unit 201 is constituted by, e.g., a modem 202 and a terminal adapter 203. The modem 202 controls communication with an information processing device such as a telephone set connected to an analog line of an analog public network or the like. The terminal adapter 203 controls communication with an information processing device connected to a digital line of an ISDN (Integrated Service Digital Network) or a PHS (Personal Handy Phone) which exchanges other digital signals. The communication function unit 201 may have a communication function other than a modem or a terminal adapter.

A signal switching controller 204 outputs a signal, which is received from an external device by the modem 202 or the terminal adapter 203, to a central processing unit 205, and outputs a signal, which is received from the central processing unit 205, to the modem 202 or the terminal adapter 203. The central processing unit 205 performs various processes under the control of an OS (Operating System) stored in a ROM (Read Only Memory) 207 in accordance with various application programs stored in the ROM 207 to control the signal switching controller 204, a RAM (Random Access Memory) 206, and a video image display unit controller 209.

The RAM 206 is designed to temporarily store data required to operate the central processing unit 205. The ROM 207 stores the OS, the application programs, and the like. A frame memory 208 corresponds to the image memory 167 shown in FIG. 24, and is designed to temporarily store an image to be provided to a user. The video image display unit controller 209 corresponds to the LED drive circuits 134R, 134G, and 134B, the controller 135, the video signal processing circuit 166, and the light bulb drive circuit 168 which are shown in FIG. 24. A video image display unit 210 corresponds to the display panel 95 and the light-emitting diodes 98R, 98G, and 98B which are shown in FIG. 24.

In the portable display device arranged as described above, for example, when the operation button 82 is operated to access a predetermined information processing device, an operation signal corresponding to the operation is supplied to the central processing unit 205. In this case, the central processing unit 205 controls the communication function unit 201 through the signal switching controller 204 to cause the communication function unit 201 to access a predetermined information processing device. In this manner, when an image signal is transmitted from the predetermined information processing device, the image signal is received by the communication function unit 201 and supplied to the central processing unit 205 through the signal switching controller 204. The central processing unit 205 temporarily stores the image signal in the RAM 206, and then supplies the image signal to the video image display unit controller 209. When the video image display unit controller 209 receives an image signal from the central processing unit 205, the video image display unit controller 209 temporarily stores the image signal in the frame memory 208. The video image display unit controller 209 reads the image signal stored in the frame memory 208 at a necessary timing, and supplies the image signal to the video image display unit 210 to display the image signal.

Voice input to the microphone 99 by a user is supplied to the communication function unit 201 through the central processing unit 205 and the signal switching controller 204 to be transmitted. When the voice is received by the communication function unit 201, the voice is supplied to the loudspeaker 83 through the signal switching controller 204 and the central processing unit 205 to be output.

The portable display device according to the present invention has been described above. The present invention can be applied to all devices, which are portably used and can display information, such as a portable telephone set, a portable television receiver, and an electronic organizer.

As has been described above, according to the portable display device of the present invention, the magnification optical system for magnifying information displayed on the display means to form an virtual image has arrangement states which are different in a non-use state from in a use state. For this reason, a device which is conveniently portable, can legibly provide a lot of information with an virtual image, and has a size smaller than that of a conventional one.

What is claimed is:

1. A portable display device comprising:
   display means for displaying information;
   a magnification optical system which magnifies an image serving as information displayed on said display means,
   characterized in that said magnification optical system has arrangement states which are different in a non-use state from in a use state,
   said display device being further characterized in that said magnification optical system is set in an arrangement state in only the use state such that the image on said display means comprises external light diffused by a diffusion plate, wherein said external light is incident on said display means.

2. A portable display device according to claim 1, characterized in that said magnification optical system is set in an accommodation state, in which said magnification optical system is accommodated in a housing, in the non-use state, and is set in an exposure state, in which the magnification optical system is exposed from said housing, in the use state.

3. A portable display device comprising:

display means for displaying information;

a magnification optical system which magnifies an image serving as information displayed on said display means;

characterized in that said magnification optical system has arrangement states which are different in a non-use state from in a use state;

a housing with a lid;

characterized in that said magnification optical system has arrangement states which are different in a closed state of said lid from in an open state of said lid; and said magnification optical system is arranged such that a display screen of said display means is magnified to form a virtual image when said lid is open.

4. A portable display device according to claim 3, characterized in that said display means displays information by using only external light or by supplementarily using external light.

5. A portable display device according to claim 3, characterized in that said magnification optical system is constituted by a convex lens and a concave mirror.

6. A portable display device according to claim 3, characterized in that a left-eye optical system and a right-eye optical system are arranged as said magnification optical system.

7. A portable display device according to claim 6, characterized in that left-eye display means and right-eye display means are arranged as said display means, and said left-eye optical system or a right-eye optical system forms an virtual image which is obtained by magnifying information displayed on said left-eye display means or said right-eye display means, respectively.

8. A portable display device according to claim 7, characterized in that said left-eye display means or said right-eye display means displays left-eye or right-eye information, respectively, and said left-eye optical system or said right-eye optical system magnifies information displayed on said left-eye display means or said right-eye display means to form a stereoscopic virtual image.

9. A portable display device according to claim 3, characterized by further comprising change means for changing a distance between the virtual image formed by said magnification optical system and a user, the size of the virtual image, or the direction of the virtual image.

10. A portable display device according to claim 9, characterized by further comprising operation means operated when said change means is controlled.

11. A portable display device according to claim 9, characterized by further comprising control means for controlling said change means in accordance with the information.

12. A portable display device according to claim 3, characterized by further comprising communication means for receiving external information or transmitting information to an external device.

13. A portable display device according to claim 3, characterized in that said portable display device can be mounted on the head of a user.

14. A portable display device according to claim 3, characterized in that the arrangement state of said display means is changed together with the arrangement state of said magnification optical system.

* * * * *